United States Patent
Itagaki et al.

(10) Patent No.: US 10,299,212 B2
(45) Date of Patent: May 21, 2019

(54) INFORMATION PROCESSING APPARATUS AND INFORMATION PROCESSING METHOD

(71) Applicant: SONY CORPORATION, Tokyo (JP)

(72) Inventors: Takeshi Itagaki, Saitama (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 9 days.

(21) Appl. No.: 15/540,590

(22) PCT Filed: Dec. 25, 2015

(86) PCT No.: PCT/JP2015/086250
§ 371 (c)(1),
(2) Date: Jun. 29, 2017

(87) PCT Pub. No.: WO2016/143232
PCT Pub. Date: Sep. 15, 2016

(65) Prior Publication Data
US 2017/0374621 A1    Dec. 28, 2017

(30) Foreign Application Priority Data

Mar. 6, 2015 (JP) .................. 2015-044610

(51) Int. Cl.
*H04W 52/02* (2009.01)
*H04W 84/12* (2009.01)
(Continued)

(52) U.S. Cl.
CPC ......... *H04W 52/0235* (2013.01); *H04L 43/16* (2013.01); *H04W 52/0245* (2013.01);
(Continued)

(58) Field of Classification Search
CPC ......... H04W 52/0235; H04W 52/0245; H04W 84/12; H04W 16/28; H04W 92/18;
(Continued)

(56) References Cited

U.S. PATENT DOCUMENTS

2014/0185501 A1* 7/2014 Park .................. H04W 52/0238
370/311
2015/0223153 A1    8/2015 Sawada

FOREIGN PATENT DOCUMENTS

| JP | 2013-106348 A | 5/2013 |
|----|---------------|--------|
| JP | 2013-247650 A | 12/2013 |
| JP | 2014-158180   | 8/2014 |

OTHER PUBLICATIONS

International Search Report dated Mar. 8, 2016 in PCT/JP2015/086250 filed Dec. 25, 2015.

* cited by examiner

*Primary Examiner* — Afshawn M Towfighi
(74) *Attorney, Agent, or Firm* — Xsensus, LLP

(57) ABSTRACT

Provided is a technique that reduces power consumption and appropriately stands by for data.
An information processing apparatus includes a control unit. The control unit performs control such that packet detection conditions are changed in a case where a first standby mode is set. The packet detection conditions are changed by switching between a first packet detection threshold value that is used in a normal standby state and a second packet detection threshold value indicating a lower packet detection probability than the first packet detection threshold value. In addition, the first packet detection threshold value and the second packet detection threshold value are packet detection threshold values to be compared with the reception level of a packet.

17 Claims, 24 Drawing Sheets

(51) Int. Cl.
*H04L 12/26* (2006.01)
*H04W 16/28* (2009.01)
*H04W 52/36* (2009.01)
*H04W 92/18* (2009.01)

(52) U.S. Cl.
CPC ............ *H04W 84/12* (2013.01); *H04W 16/28* (2013.01); *H04W 52/36* (2013.01); *H04W 92/18* (2013.01); *Y02D 70/00* (2018.01); *Y02D 70/1222* (2018.01); *Y02D 70/142* (2018.01); *Y02D 70/164* (2018.01); *Y02D 70/166* (2018.01); *Y02D 70/168* (2018.01); *Y02D 70/21* (2018.01); *Y02D 70/22* (2018.01)

(58) Field of Classification Search
CPC ....... H04W 52/36; H04L 43/16; Y02D 70/22; Y02D 70/21; Y02D 70/168; Y02D 70/166; Y02D 70/1222; Y02D 70/164; Y02D 70/142; Y02D 70/00
See application file for complete search history.

FIG. 4
EXAMPLE OF CHANGE IN OPERATION MODE OF MASTER STATION
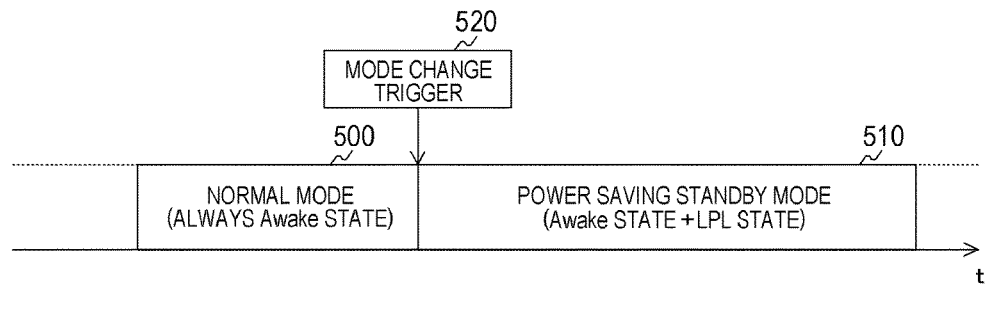
a
EXAMPLE OF CHANGE IN STATE IN POWER SAVING STANDBY MODE
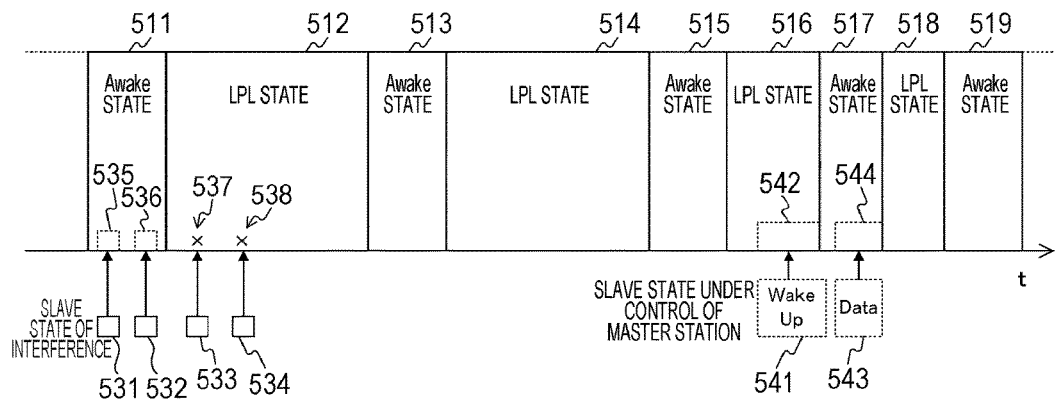
b

EXAMPLE OF OPERATION OF POWER SAVING MODE CHANGE DETERMINATION PROCESS

FIG. 8
EXAMPLE OF OPERATION OF POWER SAVING STANDBY PARAMETER DETERMINATION AND NOTIFICATION PROCESS
EXAMPLE OF OPERATION OF MASTER STATION
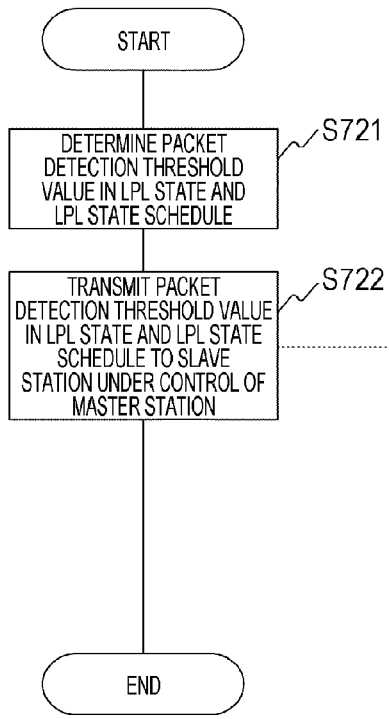
EXAMPLE OF OPERATION OF SLAVE STATION
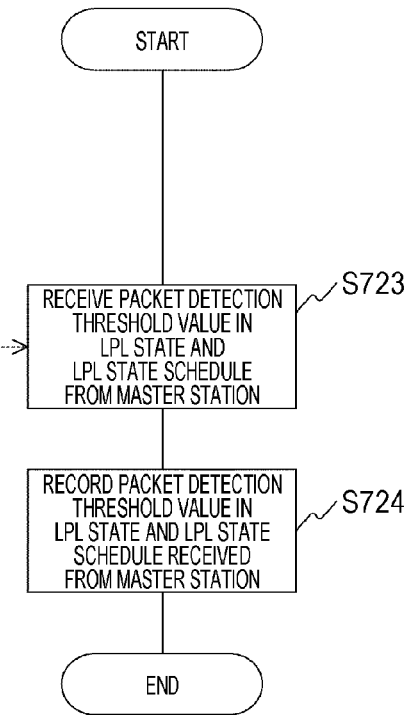

EXAMPLE OF FORMAT OF STATE CHANGE NOTIFICATION FRAME

FIG. 14  EXAMPLE OF OPERATION OF POWER SAVING STANDBY PROCESS (MASTER STATION)

FIG. 18
EXAMPLE OF OPERATION OF POWER SAVING STANDBY PARAMETER DETERMINATION AND NOTIFICATION PROCESS
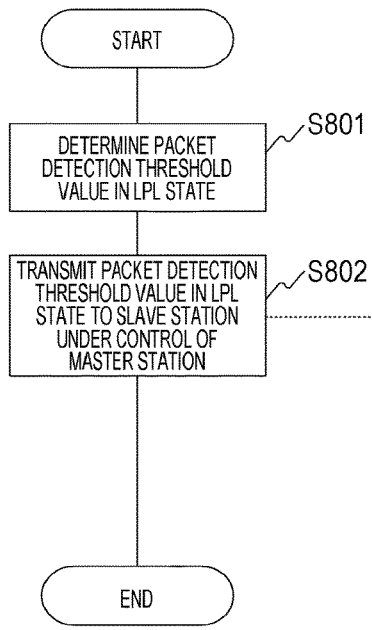
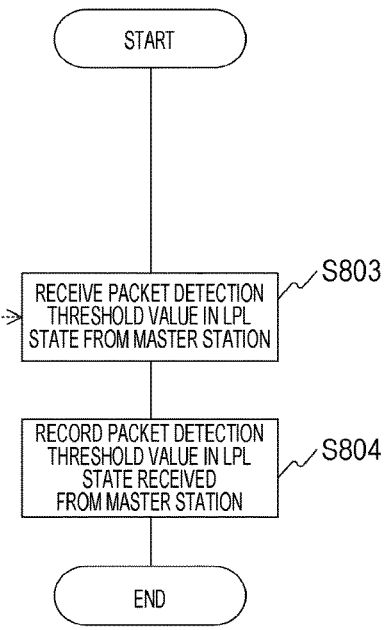

EXAMPLE OF FORMAT OF STATE CHANGE NOTIFICATION FRAME

INFORMATION PROCESSING APPARATUS AND INFORMATION PROCESSING METHOD

TECHNICAL FIELD

The present technology relates to an information processing apparatus. More particularly, the present technology relates to an information processing apparatus and an information processing method that exchange information using wireless communication.

BACKGROUND ART

In the related art, there is a wireless communication technique that exchanges information using wireless communication. For example, Institute of Electrical and Electronic Engineers (IEEE) 802.11 which is a standard related to a wireless local area network (LAN) has been spread. In addition, various apparatuses have this function and the extension of the IEEE802.11 standard related to a reduction in power consumption has continued, considering mounting to apparatuses with a limited power source.

Furthermore, a standard (Wi-Fi Direct (Wi-Fi P2P Specification)) has been proposed in which a plurality of wireless apparatuses are wirelessly connected to each other in a peer-to-peer (P2P) manner, without passing through a router, and directly exchange data.

In Wi-Fi Direct, Notice of Absence (NoA) is defined as a protocol for changing a wireless apparatus (Group Owner (GO)) that functions as a wireless master apparatus to a sleep mode. Specifically, GO notifies a client of, for example, a sleep start time and a sleep period in advance, using, for example, a beacon and sets the sleep mode.

As a technique related NoA, for example, a portable terminal has been proposed which performs a power saving mode using NoA (for example, Patent Document 1).

CITATION LIST

Patent Document

Patent Document 1: Japanese Patent Application Laid-Open No. 2013-106348

SUMMARY OF THE INVENTION

Problems to be Solved by the Invention

In the above-mentioned technique according to the related art, a master station can notify a slave station of, for example, the sleep start time and the sleep period and can set the power saving mode.

However, while the power saving mode is set in the master station, it is difficult for the slave station to perform uplink transmission. Therefore, it is assumed that, even in a case where urgent data is present in the slave station, it is difficult for the slave station to transmit the urgent data to the master station using uplink communication. As such, while the power saving mode is set in the master station, there is a concern that urgent uplink transmission from the slave station will be delayed. For this reason, it is important for the master station to reduce power consumption and to appropriately standby for the reception of data from the slave station.

The present technology has been made in view of the above-mentioned problems and an object of the present technology is to reduce power consumption and to appropriately stand by for data.

Solutions to Problems

The present technology has been made in order to solve the above-mentioned problems. According to a first aspect of the present technology, there is provided an information processing apparatus including a control unit that, in a case where a first standby mode is set, performs control such that a first packet detection threshold value which is used in a normal standby state and a second packet detection threshold value indicating a lower packet detection probability than the first packet detection threshold value are switched to change packet detection conditions. The first and second packet detection threshold values are to be compared with a reception level of a packet. In addition, according to the first aspect, there are provided an information processing method and a program that causes a computer to perform the method. With this arrangement, it is possible to change the packet detection conditions in a case where the first standby mode is set.

In addition, in the first aspect, the first standby mode may be a low power consumption standby mode. With this arrangement, it is possible to set the low power consumption standby mode.

In addition, in the first aspect, the control unit may notify other information processing apparatuses of the second packet detection threshold value at a time when the first standby mode is set. With this arrangement, it is possible to notify other information processing apparatuses of the second packet detection threshold value at the time when the first standby mode is set.

In addition, in the first aspect, the control unit may notify other information processing apparatuses of a period for which the second packet detection threshold value is set at a time when the first standby mode is set. With this arrangement, it is possible to notify other information processing apparatuses of the period for which the second packet detection threshold value is set at the time when the first standby mode is set.

In addition, in the first aspect, in a case where a packet transmitted from other information processing apparatuses is detected while the second packet detection threshold value is used, the control unit may switch the second packet detection threshold value to the first packet detection threshold value. With this arrangement, in a case where a packet from other information processing apparatus is detected while the second packet detection threshold value is used, it is possible to switch the second packet detection threshold value to the first packet detection threshold value.

In addition, in the first aspect, in a case where a packet transmitted from other information processing apparatuses is detected while the second packet detection threshold value is used and the detected packet is a cancellation request packet to request the cancellation of the use of the second packet detection threshold value, the control unit may switch the second packet detection threshold value to the first packet detection threshold value. With this arrangement, in a case where the detected packet is the cancellation request packet, it is possible to switch the second packet detection threshold value to the first packet detection threshold value.

In addition, in the first aspect, the control unit may set the first standby mode in a case where predetermined conditions are satisfied. With this arrangement, in a case where the predetermined conditions are satisfied, it is possible to set the first standby mode.

In addition, in the first aspect, the control unit may determine that the predetermined conditions are satisfied in a case where a remaining battery level is less than a first threshold value, in a case where a user's operation for setting the first standby mode is received, in a case where an amount of desired data transmitted from other information processing apparatuses is less than a second threshold value, or in a case where an amount of interference data from other information processing apparatuses is greater than a third threshold value. With this arrangement, it is possible to determine that the predetermined conditions are satisfied in a case where the remaining battery level is less than the first threshold value, in a case where the user's operation for setting the first standby mode is received, in a case where the amount of desired data transmitted from other information processing apparatuses is less than the second threshold value, or in a case where the amount of interference data from other information processing apparatuses is greater than the third threshold value.

In addition, according to a second aspect of the present technology, there is provided an information processing apparatus including a control unit that, in a case where a first standby mode is set, controls a process related to transmission of a packet, on the basis of a notice to change packet detection conditions from other information processing apparatuses. Furthermore, according to the second aspect, there are provided an information processing method and a program that causes a computer to perform the method. With this arrangement, it is possible to control signal processing and the transmission time of a processing packet related to the transmission of a packet, on the basis of the notice to change the packet detection conditions from other information processing apparatuses, in a case where the first standby mode is set.

In addition, in the second aspect, the control unit may suppress the transmission of the packet while a second packet detection threshold value indicating a lower packet detection probability than a first packet detection threshold value that is used in a normal standby state is used as the packet detection conditions in the other information processing apparatuses. With this arrangement, it is possible to suppress the transmission of a packet while the second packet detection threshold value is used.

In addition, in the second aspect, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses, the control unit may transmit a cancellation request packet to request the cancellation of the use of the second packet detection threshold value to the other information processing apparatuses. With this arrangement, when there is a packet to be transmitted to other information processing apparatuses while the second packet detection threshold value is used in other information processing apparatuses, it is possible to transmit the cancellation request packet to other information processing apparatuses.

In addition, in the second aspect, while the second packet detection threshold value is used, the control unit may perform a process which adjusts transmission power of the cancellation request packet such that a reception level is greater than the second packet detection threshold value in the other information processing apparatus and transmit the cancellation request packet to the other information processing apparatuses. With this arrangement, while the second packet detection threshold value is used, it is possible to perform the process which adjusts transmission power of the cancellation request packet such that the reception level is greater than the second packet detection threshold value in other information processing apparatus and to transmit the cancellation request packet to other information processing apparatuses.

In addition, in the second aspect, the control unit may insert information related to the transmission power into the cancellation request packet and transmit the cancellation request packet. With this arrangement, it is possible to insert the information related to the transmission power into the cancellation request packet and to transmit the cancellation request packet.

In addition, in the second aspect, while the second packet detection threshold value is used, the control unit may perform a beam steering process such that a reception level is greater than the second packet detection threshold value in the other information processing apparatus and transmit the cancellation request packet to the other information processing apparatuses. With this arrangement, while the second packet detection threshold value is used, it is possible to perform the beam steering process such that the reception level is greater than the second packet detection threshold value in other information processing apparatus and to transmit the cancellation request packet to other information processing apparatuses.

In addition, in the second aspect, the control unit may insert information for notifying that the beam steering process has been performed in transmission into the cancellation request packet and transmit the cancellation request packet. With this arrangement, it is possible to insert the information for notifying that the beam steering process has been performed in transmission into the cancellation request packet and to transmit the cancellation request packet.

In addition, in the second aspect, while the second packet detection threshold value is used, the control unit may use only a packet with priority greater than a threshold value as the packet to be transmitted to the other information processing apparatuses. With this arrangement, while the second packet detection threshold value is used, it is possible to use only the packet with priority greater than the threshold value as the packet to be transmitted to other information processing apparatuses.

In addition, in the second aspect, the control unit may insert at least one of a network identifier for identifying a network including both the information processing apparatus and the other information processing apparatuses and a terminal identifier for identifying the information processing apparatus into the cancellation request packet and transmit the cancellation request packet. With this arrangement, it is possible to insert at least one of the network identifier for identifying the network including both the information processing apparatus and other information processing apparatuses and the terminal identifier for identifying the information processing apparatus into a physical layer of the cancellation request packet and to transmit the cancellation request packet.

Effects of the Invention

According to the present technology, it is possible to obtain the beneficial effect of reducing power consumption and appropriately standing by for data. Note that the effect described herein is not necessarily limited and may be any effect described in the present disclosure.

BRIEF DESCRIPTION OF DRAWINGS

FIG. 4 is a diagram illustrating an example of a change in the operation mode of the information processing apparatus 200 in the first embodiment of the present technology.

FIG. 8 is a flowchart illustrating an example of the procedure of a power saving standby parameter determination and notification process performed by the information processing apparatuses 100 and 200 in the first embodiment of the present technology.

FIG. 18 is a flowchart illustrating an example of the procedure of a power saving standby parameter determination and notification process performed by the information processing apparatuses 100 and 200 in the fifth embodiment of the present technology.

MODE FOR CARRYING OUT THE INVENTION

Hereinafter, modes for carrying out the present technology (hereinafter, referred to as embodiments) will be described. The description will be made in the following order.

1. First embodiment (an example in which a master station switches between an awake state and an LPL state in a power saving standby mode)

2. Second embodiment (an example in which the unit of one set of switching between the awake state and the LPL state in the power saving standby mode is different from a beacon interval and another example of the transmission of a wake-up frame)

3. Third Embodiment (an example in which a master station determines switching between the awake state and the LPL state in the power saving standby mode and notifies a slave station of the determination result)

4. Fourth Embodiment (an example in which the transmission of the wake-up frame is omitted)

5. Fifth embodiment (an example in which a master station is always in the LPL state in the power saving standby mode)

6. Application Examples

1. FIRST EMBODIMENT

[Example of Configuration of Communication System]

Figure 1:
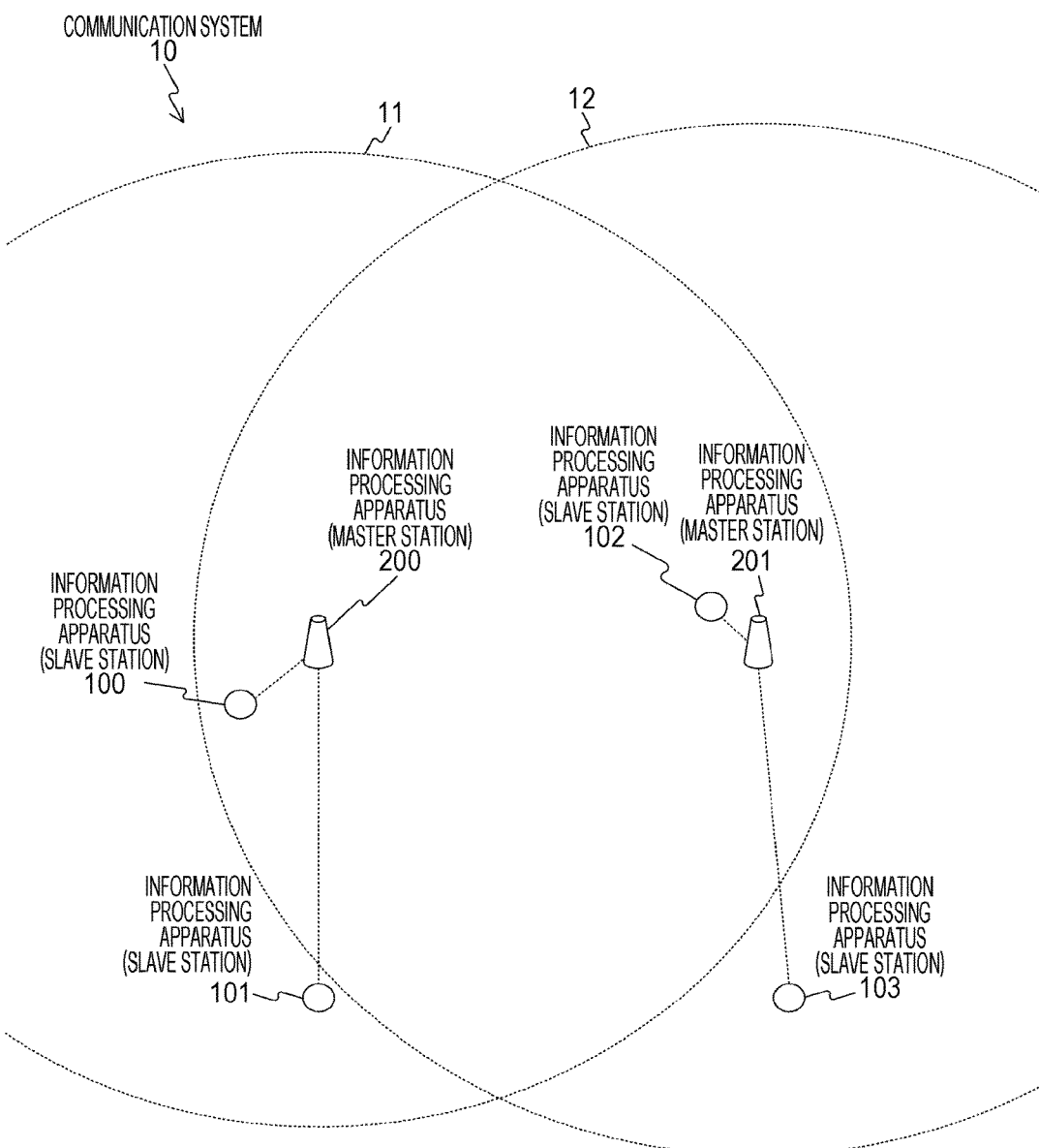
FIG. 1 is a diagram illustrating an example of the configuration of a communication system 10 in a first embodiment of the present technology.
Figure 2:
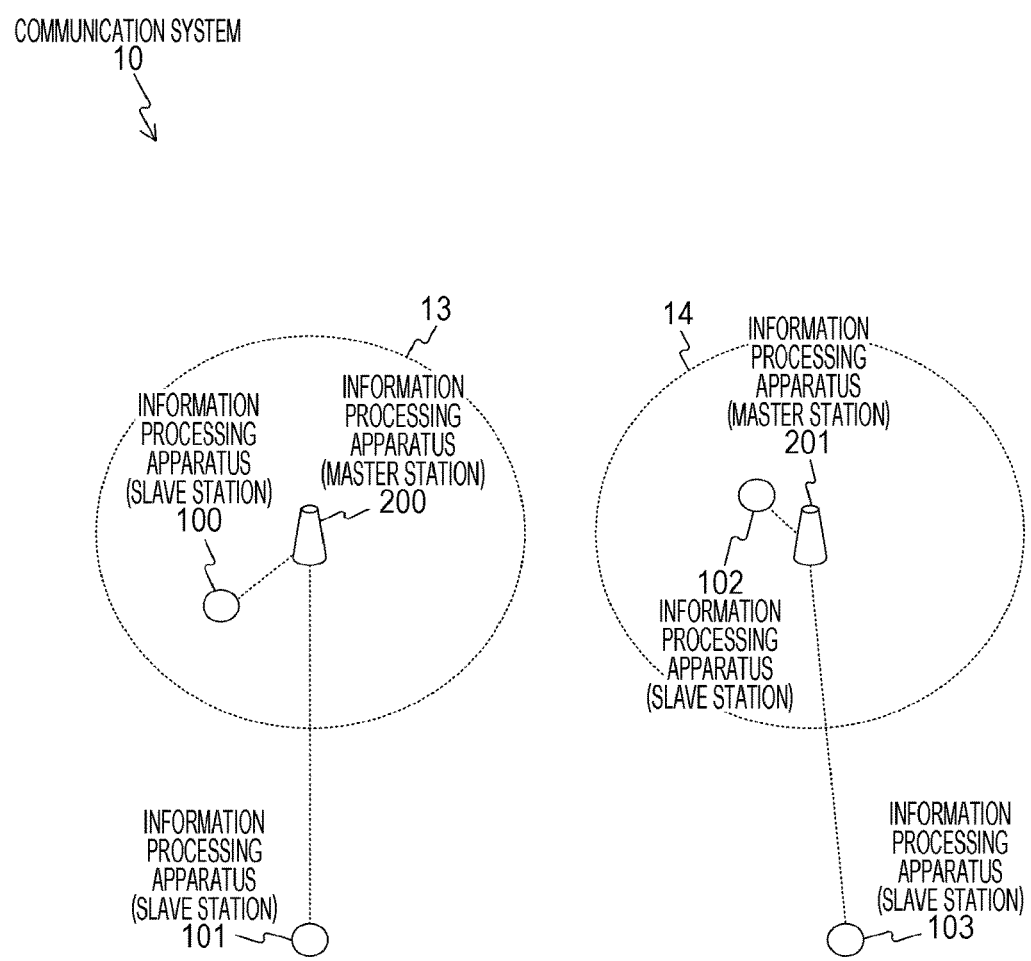
FIG. 2 is a diagram illustrating an example of the configuration of the communication system 10 in the first embodiment of the present technology.

FIGS. 1 and 2 are diagrams illustrating an example of the configuration of a communication system 10 in a first embodiment of the present technology. The communication system 10 can be, for example, a random access wireless system.

The communication system 10 includes information processing apparatuses (slave stations) 100 to 103 and information processing apparatuses (master stations) 200 and 201. Note that, hereinafter, the expression of the slave station and the master station will be appropriately omitted.

In FIGS. 1 and 2, it is assumed that the connection between the information processing apparatuses 100 and 101 and the information processing apparatus 200 is established and the connection between the information processing apparatuses 102 and 103 and the information processing apparatus 201 is established.

In addition, dotted circles 11 and 13 schematically indicate the signal detection range of the master station (information processing apparatus 200) when the transmission power of the slave station (information processing apparatuses 100 and 101) is applied. Furthermore, dotted circles 12 and 14 schematically indicate the signal detection range of the master station (information processing apparatus 201) when the transmission power of the slave station (information processing apparatuses 102 and 103) is applied.

Specifically, FIG. 1 illustrates signal detection ranges 11 and 12 in a case where the master stations (information processing apparatuses 200 and 201) are in an awake state. In addition, FIG. 2 illustrates signal detection ranges 13 and 14 in a case where the master stations (information processing apparatuses 200 and 201) are in a low power listen (LPL) state. Furthermore, the awake state and the LPL state will be described in detail with reference to FIG. 4.

The information processing apparatuses 100 to 103 are, for example, portable information processing apparatuses (wireless communication apparatuses) with a wireless communication function. In addition, the information processing apparatuses 200 and 201 are, for example, fixed or portable information processing apparatuses (wireless communication apparatuses) with a wireless communication function.

Here, the portable information processing apparatus is an information processing apparatus such as a smart phone, a mobile phone, or a tablet terminal. In addition, the fixed information processing apparatus is an information processing apparatus such as an access point or a base station.

In addition, it is assumed that the information processing apparatuses 100 to 103, 200, and 201 have a communication function based on, for example, a wireless local area network (LAN) standard of Institute of Electrical and Electronic Engineers (IEEE) 802. 11. For example, Wireless Fidelity (Wi-Fi), Wi-Fi Direct, and Wi-Fi CERTIFIED Miracast specification (technical specification name: Wi-Fi Display) can be used as the wireless LAN. In addition, wireless communication using other communication systems may be performed.

Furthermore, it is assumed that the information processing apparatuses 200 and 201 function as master stations (master apparatuses) and the information processing apparatuses 100 to 103 function as slave stations (slave apparatuses). In addition, it is assumed that the information processing apparatuses 200 and 201 function as access points and the information processing apparatuses 100 to 103 function as apparatuses under the control of the access point. That is, FIG. 1 illustrates an example in which there are two wireless master stations (information processing apparatuses 200 and 201) and two wireless slave stations (information processing apparatuses 100 to 103) are connected to each master apparatus. Note that the system configuration which is a target in the embodiment of the present technology is not limited thereto. In addition, FIG. 1 illustrates an example of the communication system including two wireless master stations and four wireless slave stations. However, the number of wireless master stations and the number of wireless slave stations are not limited thereto. For example, the embodiment of the present technology can be applied to a communication system including three or more wireless master stations (information processing apparatuses). Furthermore, for example, the embodiment of the present technology can be applied to a communication system including three or five or more wireless slave stations (information processing apparatuses).

In addition, for the relationship between two information processing apparatuses that communicate with each other, one of the two information processing apparatuses may be a master station and the other information processing apparatus may be a slave station. Furthermore, the connection between two information processing apparatuses may be direct communication connection between slave stations.

[Example of Configuration of Information Processing Apparatus (Master Station)]

Figure 3:
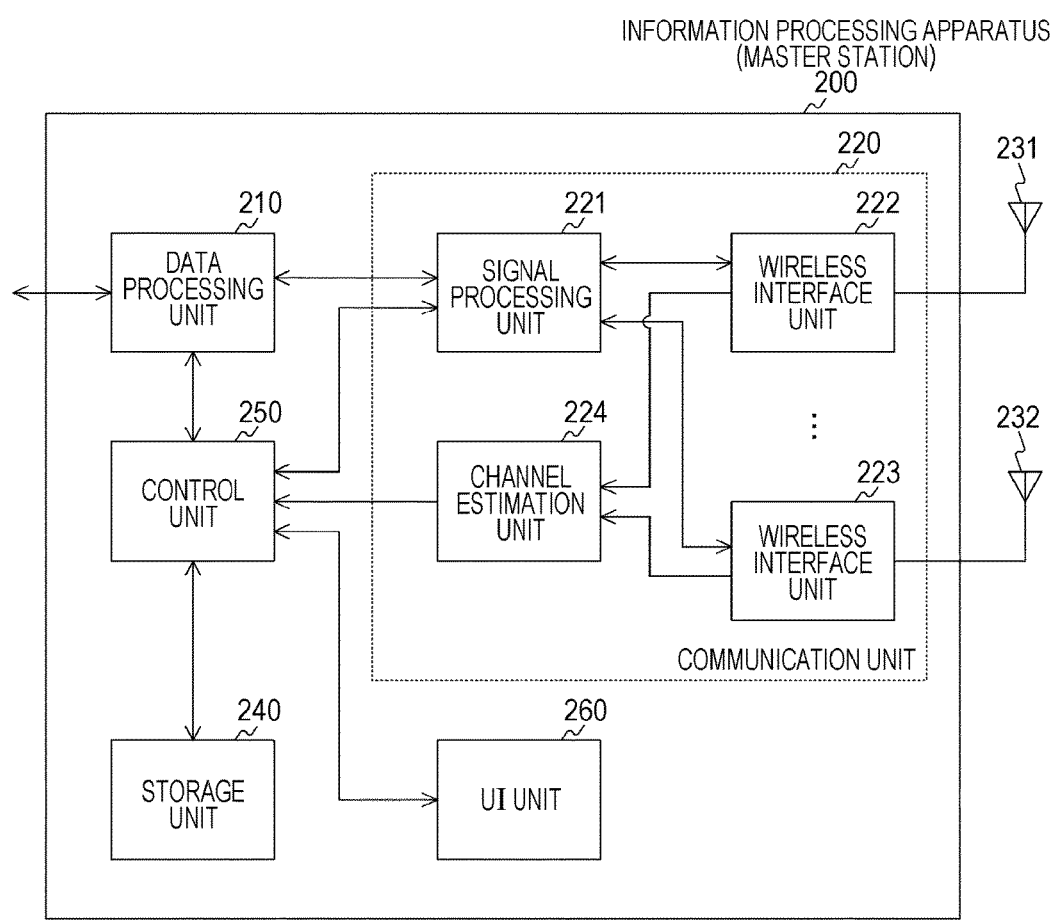
FIG. 3 is a block diagram illustrating an example of the functional configuration of an information processing apparatus 200 in the first embodiment of the present technology.

FIG. 3 is a block diagram illustrating an example of the functional configuration of the information processing apparatus 200 in the first embodiment of the present technology. Note that, since the functional configuration (functional configuration related to wireless communication) of the information processing apparatuses 100 to 103 and 201 is substantially similar to the functional configuration of the information processing apparatus 200, the description thereof will not be repeated here.

The information processing apparatus 200 includes a data processing unit 210, a communication unit 220, antennas 231 and 232, a storage unit 240, a control unit 250, and a user interface (UI) unit 260. Note that FIG. 2 illustrates an example in which the information processing apparatus 200 includes two sets of wireless interface units 222 and 223 and the antennas 231 and 232. However, the information processing apparatus 200 may include one set or three or more sets of the wireless interface units and the antennas.

The data processing unit 210 processes various kinds of data under the control of the control unit 250. For example, at the time of transmission in a case where there is data input from an upper layer, the data processing unit 210 performs a process of adding a header to the data or a process of adding an error detection code to the data to generate a packet for wireless transmission. Then, the data processing unit 210 supplies the generated packet to the communication unit 220. In addition, for example, in a case where an input is received from the communication unit 220, the data processing unit 210 performs a header analysis process, a packet error detection process, and a reordering process and supplies the processed data to a protocol layer above the data processing unit 210.

The communication unit 220 includes a signal processing unit 221, the wireless interface units 222 and 223, and a channel estimation unit 224.

The signal processing unit 221 performs various kinds of signal processing under the control of the control unit 250. For example, at the time of transmission, the signal processing unit 221 performs signal processing, such as encoding, interleaving, and modulation, for data input from the data processing unit 210 on the basis of coding and modulation schemes set by the control unit 250. In addition, for example, the signal processing unit 221 performs signal processing for calculating a complex antenna weight that is used for beam steering or beam forming, if necessary. Furthermore, for example, the signal processing unit 221 generates a preamble signal and adds the preamble signal, if necessary. Then, the signal processing unit 221 supplies a transmission symbol sequence and the complex antenna weight obtained by the signal processing to the wireless interface units 222 and 223.

Further, at the time of reception, for example, the signal processing unit 221 performs a process which is opposite to the process at the time of transmission for a received symbol sequence input from the wireless interface unit 222 and supplies the processed data to the data processing unit 210. In addition, for example, the signal processing unit 221 performs a packet detection determination process that determines whether a packet is detected from inputs from the wireless interface units 222 and 223. Specifically, the signal processing unit 221 can determine the detection of a packet on the basis of whether the output level of a correlation operation performed according to a procedure that is defined by a standard in advance is greater than a predetermined threshold value. Hereinafter, the threshold value is referred to as a "packet detection threshold value".

The wireless interface units 222 and 223 are connected to other information processing apparatuses and are used to transmit and receive various kinds of information. For example, at the time of transmission, the wireless interface units 222 and 223 perform digital/analog conversion, amplification, filtering, and frequency up-conversion for the input from the signal processing unit 221 and transmit the processed signals to the antennas 231 and 232.

In addition, as illustrated in FIG. 3, in a case where there are a plurality of wireless interface units 222 and 223, the wireless interface units 222 and 223 perform a process that multiplies the input from the signal processing unit 221 by a complex antenna weight, if necessary. In this way, it is possible to achieve beam steering that increases the gain in a specific direction (or beam forming that increases the gain at a specific position).

Furthermore, for example, at the time of reception, the wireless interface units 222 and 223 perform a reverse process for the inputs from the antennas 231 and 232 and supply the processing results to the signal processing unit 221 and the channel estimation unit 224.

The channel estimation unit 224 calculates complex channel gain information of a transmission path from a preamble portion or a training signal portion in the signals input from the wireless interface units 222 and 223. The calculated complex channel gain information is used for demodulation in the signal processing unit 221 through the control unit 250, or is used to calculate the complex antenna weight in the signal processing unit 221 through the control unit 250, if necessary.

The storage unit 240 serves as a work area in data processing performed by the control unit 250 or functions as a storage medium that stores various kinds of data. For example, a storage medium, such as a non-volatile memory, a magnetic disk, an optical disk, or a magneto-optical (MO) disk, can be used as the storage unit 240. In addition, for example, an electrically erasable programmable read-only memory (EEPROM) or an erasable programmable ROM (EPROM) can be used as the non-volatile memory. Further, for example, a hard disk or a discoid magnetic disk can be used as the magnetic disk. Furthermore, for example, a compact disc (CD), a digital versatile disc recordable (DVD-R), or a Blu-ray disc (BD (registered trademark)) can be used as the optical disk.

The control unit 250 controls the transmitting and receiving operations of each of the data processing unit 210 and the communication unit 220. For example, the control unit 250 performs the exchange of information between units, the setting of communication parameters, and the scheduling of packets in the data processing unit 210.

For example, in a case where the power saving standby mode (low power consumption standby mode) is set, the control unit 250 performs control such that packet detection conditions are changed. Note that the power saving standby mode is an example of a first standby mode described in the claims. For example, the control unit 250 can change a packet detection threshold value to be compared with the reception level of a packet as the packet detection conditions. In addition, for example, the control unit 250 switches a first packet detection threshold value (a packet detection threshold value in the awake state) that is used in a normal standby state and a second packet detection threshold value (a packet detection threshold value in the LPL state) indicating a lower packet detection probability than the first packet detection threshold value. An example of the switching will be described in detail with reference to FIG. 4.

The UI unit 260 is an interface for information exchange between the information processing apparatus 200 and the user. For example, the UI unit 260 includes an operation unit that the user uses to input an operation input and an output unit (for example, a display unit or a voice output unit) that presents information to the user. For example, the UI unit 260 is implemented by an operation member, such as a switch, a button, or a touch panel.

Note that, in the following description, the information processing apparatus 200 is mainly used as the master station and the information processing apparatus 100 is mainly used as the slave station.

[Example of Change in Operation Mode in Master Station]

FIG. 4 is a diagram illustrating an example of a change in the operation mode of the information processing apparatus 200 in the first embodiment of the present technology. Note that, in FIG. 4, the horizontal axis is a time axis. Specifically, a of FIG. 4 illustrates an example of a change between a normal mode 500 and a power saving standby mode 510 and b of FIG. 4 illustrates an example of a change in a state (the awake state and the low power listen (LPL) state) in the power saving standby mode 510.

Here, two kinds of states, that is, the awake state and the LPL state are defined as the standby state of the master station. In both the awake state and the LPL state, an analog circuit and a preamble correlator in the master station operate together. However, in the awake state and the LPL state, signal levels for a packet detection process are different from each other. Specifically, in the LPL state, a packet detection threshold value with more strict detection conditions than that in the awake state is applied. For example, the packet detection threshold value in the LPL state can be −62 dBm and the packet detection threshold value in the awake state can be −82 dBm. In addition, here, an example in which the packet detection threshold value in the awake state and the packet detection threshold value in the LPL state are fixed values is given. However, for example, the packet detection threshold value in the awake state may be variable in a certain range. Furthermore, an offset may be applied to the variation such that the packet detection threshold value in the LPL state is also variable in a certain range.

Furthermore, the normal mode 500 is a standby mode in which the information processing apparatus is always in the awake state. In contrast, the power saving standby mode 510 is a standby mode in which the awake state and the LPL state are alternately changed.

As illustrated in a of FIG. 4, in the information processing apparatus 200, one of the normal mode 500 and the power saving standby mode 510 is set. For example, in a case where the normal mode 500 is set, when a mode change trigger 520 is output, the power saving standby mode 510 is set. In addition, in a case where some conditions (a set time and a mode change trigger) are satisfied, the mode switches from the power saving standby mode 510 to the normal mode.

Figure 6:
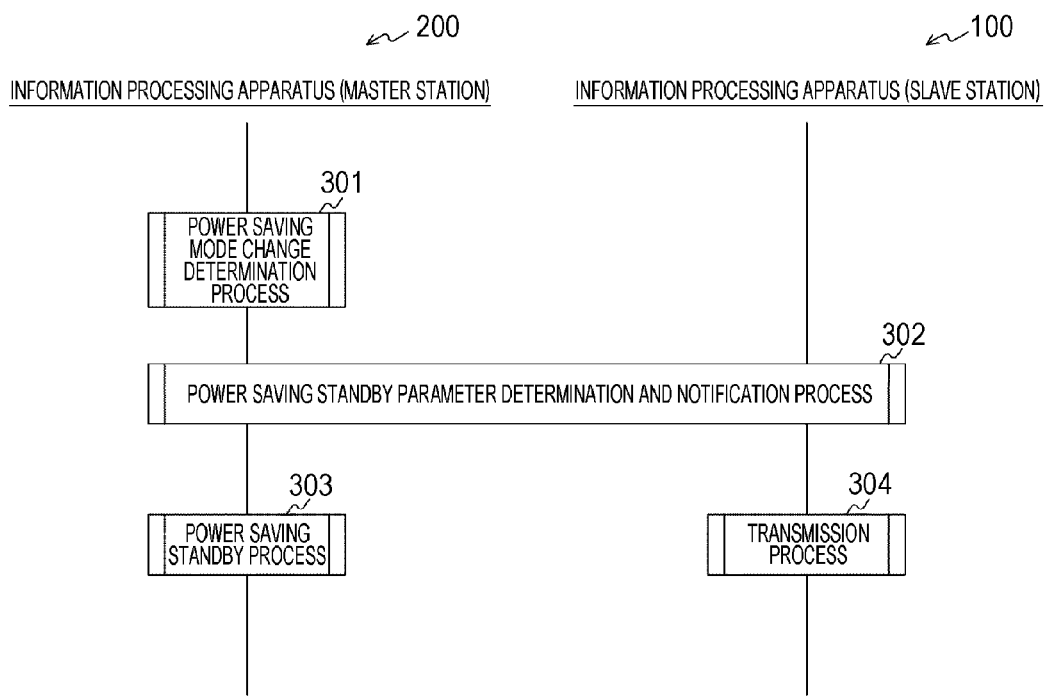
FIG. 6 is a sequence chart illustrating an example of a communication process between the apparatuses forming the communication system 10 in the first embodiment of the present technology.

In addition, as illustrated in b of FIG. 4, when the power saving standby mode 510 is set, awake states 511, 513, and 515 and LPL states 512 and 514 are alternately switched according to the schedule that is determined by a power saving standby parameter determination process (illustrated in FIG. 6).

In this case, in the awake state 511, since the packet detection threshold value is relatively small, incoming interference frames 531 and 532 are detected and a receiving operation is performed. However, in the LPL state 512, since the packet detection threshold value is relatively large, it is possible to reduce the probability of detecting incoming interference frames 533 and 534. Therefore, in the LPL state 512, it is possible to reduce the probability that the incoming interference frames 533 and 534 will be detected and the receiving operation will be performed. Note that, in b of FIG. 4, a state in which a packet is detected is represented by dotted rectangles 535, 536, 542, and 544 and a state in which a packet is not detected is represented by crosses (x) 537 and 538.

Here, in a case where a wake-up frame 541 is detected for the period for which the state is the LPL state 516, the state changes from the LPL state 516 to the awake state 517. In the awake state 517, data 543 transmitted from the slave station that has transmitted the wake-up frame 541 is received. In addition, in a case where the transmission of the data 543 from the slave station that has transmitted the wake-up frame 541 ends, the state changes from the awake state 517 to the LPL state 518. Then, until a new wake-up frame is detected, the awake state 519 and the LPL state 518 are alternately switched according to the schedule determined by the power saving standby parameter determination process (illustrated in FIG. 6).

As such, for the period for which the state is the LPL state, it is possible to reduce the probability that incoming interference will be detected and the receiving operation will be performed. Therefore, for the period for which the state is the LPL state, the power consumed for a receiving process can be less than that in the awake state. In addition, for example, even in an environment in which there is a large amount of incoming interference, for the period for which the state is the LPL state, it is possible to reduce the probability that incoming interference will be detected and the receiving operation will performed and the power consumed for the receiving process can be less than that in the awake state.

As described above, FIG. 1 illustrates the signal detection ranges 11 and 12 in a case where the master stations (information processing apparatuses 200 and 201) are in the awake state. In addition, FIG. 2 illustrates the signal detection ranges 13 and 14 in a case where the master stations (information processing apparatuses 200 and 201) are in the LPL state.

As illustrated in FIG. 2, the signal detection ranges 13 and 14 in a case where the master stations (information processing apparatuses 200 and 201) are in the LPL state are narrower than the signal detection ranges 11 and 12 illustrated in FIG. 1. Therefore, the master stations (information processing apparatuses 200 and 201) can reduce the probability of detecting data transmitted from other basic service sets (BSSs). However, there is the possibility that the master stations (information processing apparatuses 200 and 201) will not detect data transmitted from the host BSS. For example, in the example illustrated in FIG. 2, the information processing apparatuses 101 and 103 are out of the signal detection ranges. Therefore, it is important for the information processing apparatuses 101 and 103 to maintain the condition in which necessary communication is performed. For this reason, in the embodiment of the present technology, an example in which the master station can reduce power consumption and can appropriately stand by for the reception of data from the slave station is given.

[Example of Format of Beacon Frame]

Figure 5:
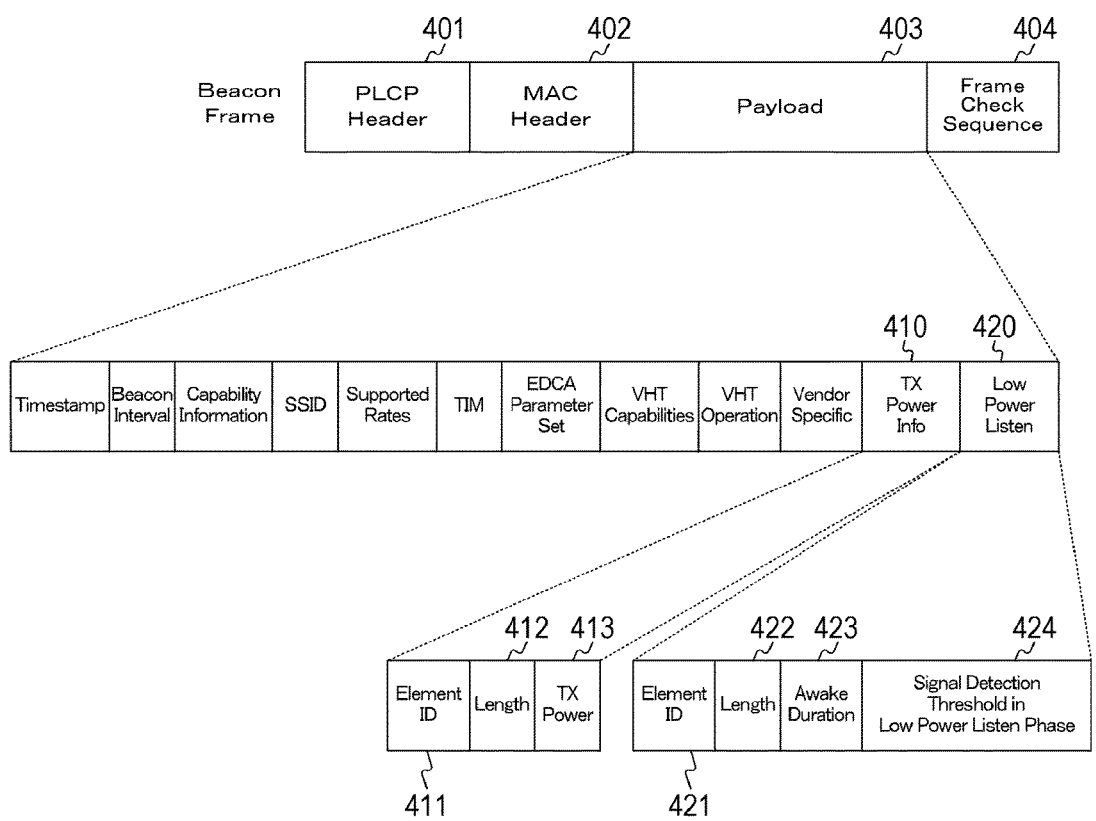
FIG. 5 is a diagram illustrating an example of the format of a beacon frame transmitted from the information processing apparatus 200 in the first embodiment of the present technology.

FIG. 5 is a diagram illustrating an example of the format of a beacon frame transmitted from the information processing apparatus 200 in the first embodiment of the present technology.

The beacon frame includes Physical Layer Convergence Protocol (PLOP) Header 401, Media Access Control (MAC) Header 402, Payload 403, and Frame Check Sequence (FCS) 404.

The Payload 403 includes TX Power info 410 and Low Power Listen 420.

The TX Power info 410 includes Element ID 411, Length 412, and TX Power 413. In addition, the Tx Power info 410 is a field that is always provided.

The Element ID 411 is a field which stores an element ID indicating that information related to transmission power used to transmit the beacon frame has been stored.

The Length 412 is a field which stores the length of an element of the information related to transmission power used to transmit the beacon frame.

The TX Power 413 is a field which stores the information related to transmission power used to transmit the beacon frame.

The Low Power Listen 420 includes Element ID 421, Length 422, Awake Duration 423, and Signal Detection Threshold in Low Power Listen Phase 424. In addition, the Low Power Listen 420 is a field that is added to the time when the master station is set to the power saving standby mode.

The Element ID 421 is a field which stores an element ID indicating that information related to the power saving standby mode has been stored.

The Length 422 is a field which stores the length of an element of the information related to the power saving standby mode.

The Awake Duration 423 is a field that stores information related to schedules (schedules in the awake state and the LPL state) in a case where the power saving standby mode is set. For example, awake duration can be stored as the information related to the schedules.

The Signal Detection Threshold in Low Power Listen Phase 424 is a field that stores information related to packet detection conditions in a case where the power saving standby mode is set. For example, the packet detection threshold value in the LPL state can be stored as the information related to the packet detection conditions.

As such, the master station inserts parameters (for example, the packet detection threshold value in the LPL state and awake duration in the power saving standby mode) determined by the power saving standby parameter determination process (illustrated in FIG. 6) into the beacon frame and informs its slave stations of the beacon frame. In addition, the master station inserts the information related to transmission power used to transmit the beacon frame into the beacon frame and informs its slave stations of the beacon frame.

When receiving the beacon frame, the slave station can check that the master station has changed to the power saving standby mode, on the basis of the Low Power Listen 420 included in the beacon frame. Then, the slave station acquires the packet detection threshold value in the LPL state and awake duration in the power saving standby mode and stores the acquired information therein.

[Example of Communication]

FIG. 6 is a sequence chart illustrating an example of a communication process in each apparatus forming the communication system 10 in the first embodiment of the present technology. FIG. 6 illustrates the flow of processes common to the first to fourth embodiments of the present technology.

In addition, in FIG. 6, each process performed between the information processing apparatus 100 and the information processing apparatus 200 is divided into four phases and will be described. That is, the process is divided into the four phases of a power saving standby mode change determination process, a power saving standby parameter determination and notification process, a power saving standby process, and a transmission process and will be described. Note that, in each embodiment of the present technology, each phase will be described. However, for combinations of the phases, the present technology can also be applied to combinations beyond each embodiment of the present technology.

Note that, in FIG. 6, as the relationship between the master station and the slave station, only the relationship between the information processing apparatus 100 and the information processing apparatus 200 is illustrated. However, the relationship between other information processing apparatuses is similar to the above-mentioned relationship.

First, the information processing apparatus 200 performs the power saving standby mode change determination process (301). The power saving standby mode change determination process will be described in detail with reference to FIG. 7.

Then, the power saving standby parameter determination and notification process is performed between the information processing apparatus 200 and the information processing apparatus 100 (302). The power saving standby parameter determination and notification process will be described in detail with reference to FIG. 8.

Then, the information processing apparatus 200 performs the power saving standby process (303). The power saving standby process will be described in detail with reference to FIG. 9.

Then, the information processing apparatus 100 performs the transmission process (304). The transmission process will be described in detail with reference to FIG. 10.

[Example of Operation of Power Saving Mode Change Determination Process]

As illustrated in FIG. 4, the master station determines whether to switch between the power saving standby mode and the normal mode. Here, an example of the criteria will be described.

Figure 7:
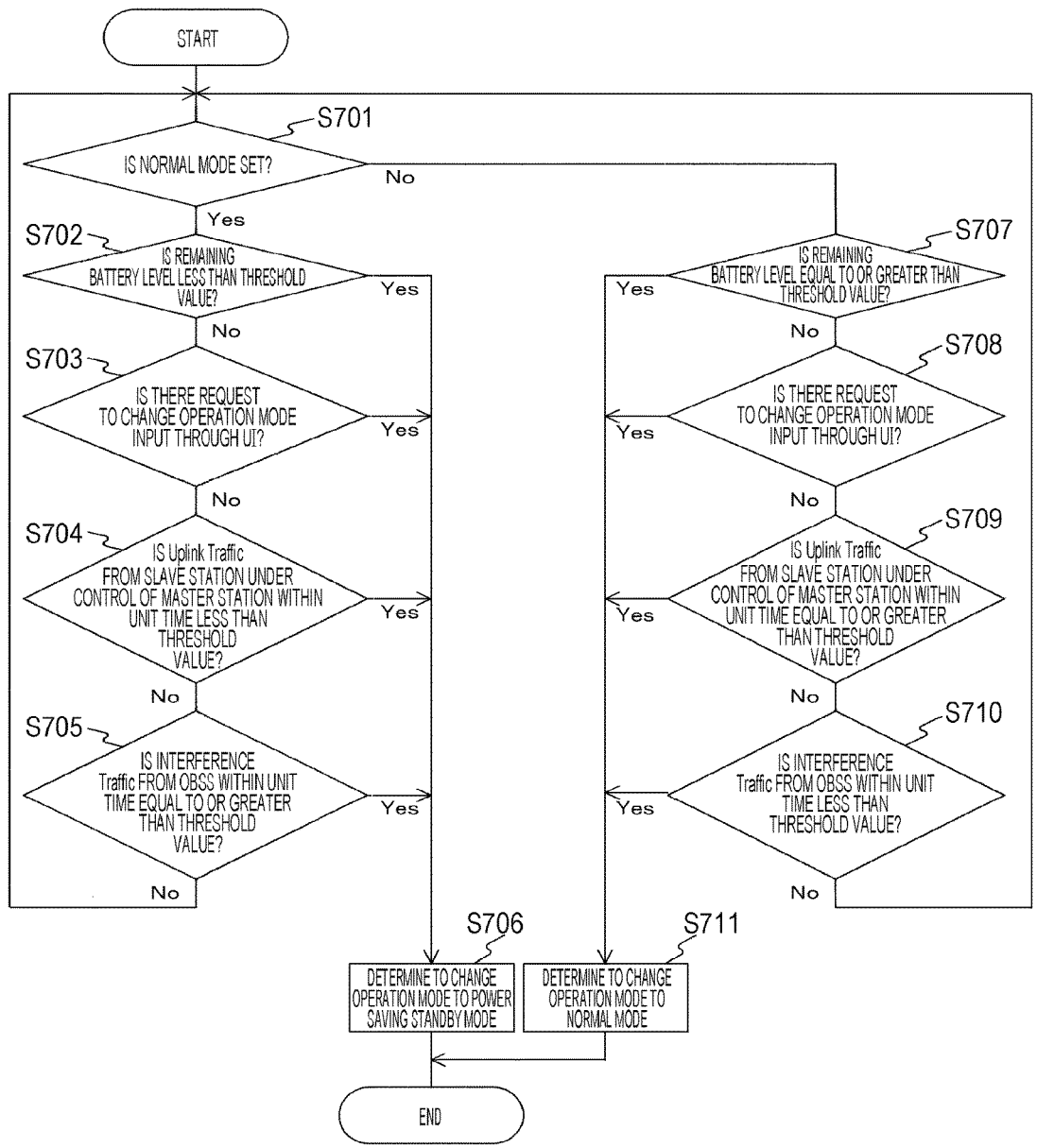
FIG. 7 is a flowchart illustrating an example of the procedure of a power saving mode change determination process performed by the information processing apparatus 200 in the first embodiment of the present technology.

FIG. 7 is a flowchart illustrating an example of the procedure of the power saving mode change determination process performed by the information processing apparatus 200 in the first embodiment of the present technology.

First, the control unit 250 of the information processing apparatus 200 determines whether the normal mode is set in the information processing apparatus 200 (Step S701).

In a case where the normal mode is set (Step S701), the control unit 250 determines whether the remaining battery level of the information processing apparatus 200 is less than a threshold value (Step S702). For example, about 30% of the total battery charge can be set as the threshold value. In a case where the remaining battery level of the information processing apparatus 200 is less than the threshold value (Step S702), the control unit 250 determines to change the operation mode to the power saving standby mode (Step S706).

In a case where the remaining battery level of the information processing apparatus 200 is equal to or greater than the threshold value (Step S702), the control unit 250 determines whether a request to change the operation mode has been received (Step S703). For example, the control unit 250 determines whether an operation for changing the operation mode (an explicit UI operation requiring a mode change) has been performed through the UI unit 260. In a case where the request to change the operation mode has been received (Step S703), the control unit 250 determines to change the operation mode to the power saving standby mode (Step S706).

In a case where there is no request to change the operation mode (Step S703), the control unit 250 determines whether the amount of uplink packet (the amount of uplink traffic) detected from the slave station under the control of the master station in a unit time is less than a threshold value (Step S704). In a case where the amount of uplink packet is less than the threshold value (Step S704), the control unit 250 determines to change the operation mode to the power saving standby mode (Step S706).

In a case where the amount of uplink packet is equal to or greater than the threshold value (Step S704), the control unit 250 determines whether the detected amount of packet (the amount of interference traffic) transmitted from OBSS in a unit time is equal to or greater than a threshold value (Step S705). Note that the OBSS means an overlap BSS. In a case where the amount of packet is equal to or greater than the threshold value (Step S705), the control unit 250 determines to change the operation mode to the power saving standby mode (Step S706). In addition, in a case where the amount of packet is less than the threshold value (Step S705), the process returns to Step S701.

In a case where the power saving standby mode is set (Step S701), the control unit 250 proceeds to Step S707 and determines whether to change the operation mode to the normal mode on the basis of the same criteria as described above (Steps S707 to S711).

As such, the master station always determines whether to change the operation mode on the basis of each of the criteria. Note that FIG. 7 illustrates an example in which the control unit determines whether to change the operation mode on the basis of four criteria. However, some of the criteria may be used or other criteria may be used.

As such, the control unit 250 can set the power saving standby mode in a case where predetermined conditions are satisfied.

[Example of Operation of Power Saving Standby Parameter Determination and Notification Process]

FIG. 8 is a flowchart illustrating an example of the procedure of the power saving standby parameter determination and notification process performed by the information processing apparatuses 100 and 200 in the first embodiment of the present technology. FIG. 8 illustrates an example in which, after determining to change the operation mode to the power saving standby mode, the information processing apparatus 200 determines parameters related to the power saving standby mode. Specifically, FIG. 8 illustrates an example in which the packet detection threshold value in the LPL state and an LPL state schedule (the schedule of the awake state and the LPL state) are determined as the parameters related to the power saving standby mode.

First, the control unit 250 of the information processing apparatus 200 determines the packet detection threshold value in the LPL state and the LPL state schedule (Step S721). Specifically, the control unit 250 determines each parameter such that the time rate of a reception state in the power saving standby mode is equal to or less than a threshold value, on the basis of each information item of the information processing apparatus 200. For example, it is possible to determine each parameter on the basis of the record of a received signal strength indicator (RSSI) of the past communication. For example, the packet detection threshold value in the LPL state increases to reduce the time rate of the reception state. In addition, time in the LPL state increases to reduce the time rate of the reception state.

Next, a detailed example of the calculation of each parameter will be described.

For example, the control unit 250 of the information processing apparatus 200 collects the RSSI information of the packets detected in the past in advance. Then, the control unit 250 obtains the cumulative probability distribution C (p) of the RSSI on the basis of the samples of the frequency of occurrence of each RSSI, with reference to the record of the RSSI information. Here, it is assumed that C (p) indicates the probability of the RSSI having a level equal to or greater than p.

Then, the control unit 250 determines a target reception time rate R_Rx in the power saving standby mode. For example, it is possible to calculate average power consumption for satisfying the remaining battery level of the information processing apparatus 200 and the desired driving time of the information processing apparatus 200, on the basis of the remaining battery level and the desired driving time. The allowable value of the time rate at which the information processing apparatus 200 is in the reception state is obtained by a combination of the average power consumption and information about the power consumption of the information processing apparatus 200 in the reception state and the standby state.

For example, R_Rx is 0.2 in a case where a reception state time rate of 20% is desired. Then, an LPL state time rate L (in the range of 0 to 1) and a packet detection threshold value Th_LPL in the LPL state are determined such that R_Rx satisfies the following Expression 1:

$$R\_Rx=(1-L) \times C(Th\_Awake)+L \times C(Th\_LPL) \qquad \text{Expression 1}$$

Here, Th_Awake is the packet detection threshold value in the awake state. In addition, the packet detection threshold value Th_Awake in the awake state can be similar to the packet detection threshold value used in the normal mode. Note that, for the packet detection threshold value used in the normal mode, a value of −82 dBm (per 20 MHz) is generally used as a reference value.

In the first embodiment of the present technology, an example in which control is performed with the unit of one set of switching between the awake state and the LPL state being equal to a beacon interval is given. Awake duration in the beacon interval is derived on the basis of the LPL state time rate L and the beacon interval.

Then, the control unit 250 of the information processing apparatus 200 stores the determined parameters (the packet detection threshold value Th_LPL in the LPL state and the awake duration) in the beacon frame and informs the slave stations under the control of the information processing apparatus 200 of the beacon frame (Step S722). In this case, the control unit 250 stores the information (transmission power information) related to transmission power used to transmit the beacon frame in the beacon frame and informs the slave stations of the beacon frame (Step S722). For example, in the beacon frame illustrated in FIG. 5, the transmission power information is stored in the TX Power 413 and the awake duration is stored in the Awake Duration 423. Similarly, in the beacon frame illustrated in FIG. 5, the packet detection threshold value Th_LPL in the LPL state is stored in the Signal Detection Threshold in Low Power Listen Phase 424.

In addition, the control unit 250 of the information processing apparatus 200 records the determined parameters (the packet detection threshold value Th_LPL in the LPL state and the awake duration) in the storage unit 240.

Furthermore, the information processing apparatus 100 receives the beacon frame transmitted from the information processing apparatus 200 (Step S723). In this case, the control unit of the information processing apparatus 100 can determine whether the information processing apparatus 200 has changed to the power saving standby mode, on the basis of whether the Low Power Listen 420 (see FIG. 5) is present in the received beacon frame.

FIG. 8 illustrates an example in which the information processing apparatus 200 inserts the Low Power Listen 420 (illustrated in FIG. 5) into a beacon frame and transmits the beacon frame. Therefore, the control unit of the information processing apparatus 100 can check that the information processing apparatus 200 has changed to the power saving standby mode on the basis of the received beacon frame.

Then, the control unit of the information processing apparatus 100 acquires each parameter (the packet detection threshold value Th_LPL in the LPL state and the awake duration) included in the received beacon frame and records the acquired parameters in the storage unit (Step S724). In addition, the control unit of the information processing apparatus 100 estimates propagation attenuation on the basis of the reception intensity (reception level) of the received beacon frame and the transmission power information stored in the Tx Power 413 (illustrated in FIG. 5) of the beacon frame. Then, the control unit of the information processing apparatus 100 records the estimated propagation attenuation in the storage unit.

As such, the control unit 250 of the information processing apparatus 200 notifies the information processing apparatus 100 of the second packet detection threshold value (the packet detection threshold value in the LPL state) at the time when the power saving standby mode is set. In addition, the control unit 250 of the information processing apparatus 200 notifies the information processing apparatus 100 of information (awake duration) related to the period, for which the second packet detection threshold value (the packet detection threshold value in the LPL state) is set, at the time when the power saving standby mode is set.

Note that, in the example illustrated in FIG. 8, the determined parameters (the packet detection threshold value Th_LPL in the LPL state and the awake duration) and the transmission power information are inserted into the beacon frame and the beacon frame is transmitted. However, the control unit of the master station may notify the slave stations under the control of the master station of other types of frames. In addition, in the example illustrated in FIG. 8, the awake duration is transmitted as information related to the schedule of the awake state and the LPL state. However, other kinds of information may be used as long as they can specify the schedule of the awake state and the LPL state.

Furthermore, in a case where L is 1 in Expression 1, the Awake Duration 423 of the Low Power Listen 420 in the beacon frame can be omitted. This example will be described in the fifth embodiment of the present technology.

[Example of Operation of Power Saving Standby Process (Master Station)]

Figure 9:
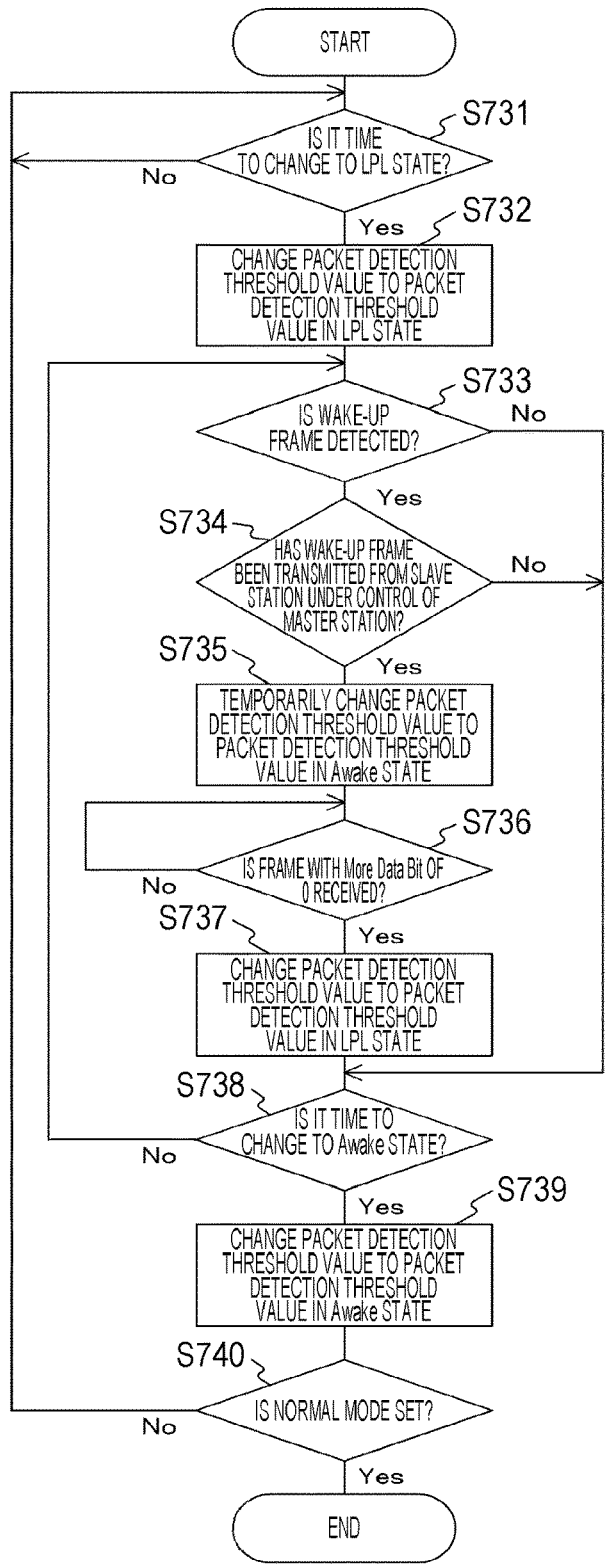
FIG. 9 is a flowchart illustrating an example of the procedure of a power saving standby process performed by the information processing apparatus 200 in the first embodiment of the present technology.

FIG. 9 is a flowchart illustrating an example of the procedure of the power saving standby process performed by the information processing apparatus 200 in the first embodiment of the present technology. FIG. 9 illustrates an example of an operation in a case where the power saving standby mode is set in the information processing apparatus 200.

Here, as illustrated in FIG. 4, in a case where the power saving standby mode is set in the information processing apparatus 200, the information processing apparatus 200 switches between the awake information and the LPL state to change the packet detection threshold value according to a predetermined schedule. In addition, as described above, in the first embodiment of the present technology, it is assumed that the unit of one set of switching between the awake state and the LPL state is the beacon interval. Furthermore, it is assumed that the awake state when the power saving standby mode is set starts immediately after a beacon is received.

First, the control unit 250 of the information processing apparatus 200 determines whether it is time to change to the LPL state, on the basis of the LPL state schedule stored in the storage unit 240 (Step S731). In a case where it is not time to change to the LPL state (Step S731), the control unit 250 continues to perform monitoring.

In a case where it is time to change to the LPL state (Step S731), the control unit 250 changes the packet detection threshold value from the packet detection threshold value in the awake state to the packet detection threshold value in the LPL state (Step S732).

Then, the control unit 250 determines whether a wake-up frame has been received (Step S733). In a case where the wake-up frame has not been received (Step S733), the process proceeds to Step S738.

In a case where the wake-up frame has been received (Step S733), the control unit 250 determines whether the wake-up frame has been transmitted from the slave station under the control of the master station (Step S734). In a case where the wake-up frame has not been transmitted from the slave station under the control of the master station (Step S734), the process proceeds to Step S738.

Here, the wake-up frame is a frame that can determine whether a transmission source is the slave station under the control of the master station. For example, it is possible to determine whether the transmission source is the slave station under the control of the master station, on the basis of a MAC header or PLCP header information in the frame. For example, it is possible to determine whether the transmission source is the slave station under the control of the master station, on the basis of whether a transmitter address in the MAC header is of the slave station under the control of the master station or whether a BSSID field in the MAC header is of a host cell. In addition, for example, it is possible to determine whether the transmission source is the slave station under the control of the master station, on the basis of whether slave station identification information or BSS identification information is present in a PLCP header.

In addition, in the example illustrated in FIG. 9, the wake-up frame is detected from the frame of which the transmission source is the slave station under the control of the master station. However, the wake-up frame may be detected from an arbitrary frame. In this case, accuracy is slightly reduced, but it is possible to simplify a process.

In a case where the wake-up frame has been transmitted from the slave station under the control of the master station (Step S734), the control unit 250 temporarily changes the packet detection threshold value from the packet detection threshold value in the LPL state to the packet detection threshold value in the awake state (Step S735). As such, when the master station detects the wake-up frame in the LPL state, it temporarily changes to the awake state.

As such, after the master station temporarily changes to the awake state, the control unit 250 maintains the awake state for the period from the reception of the wake-up frame to the reception of a frame with a More data bit of 0 in a frame control field. That is, the control unit 250 continues to receive data, with the packet detection threshold value in the awake state being set.

Then, the control unit 250 determines whether the frame with a More data bit of 0 in a Frame Control field has been received (Step S736). In a case where the frame with a More data bit of 0 in a Frame Control field has not been received (Step S736), the control unit 250 continues to perform monitoring.

In a case where the frame with a More data bit of 0 has been received (Step S736), the control unit 250 returns the packet detection threshold value from the packet detection threshold value in the awake state to the packet detection threshold value in the LPL state (Step S737). That is, in a case where the frame with a More data bit of 0 has been received, the master station changes to the LPL state again.

Then, the control unit 250 determines whether it is time to change to the awake state, on the basis of the LPL state schedule stored in the storage unit 240 (Step S738). In a case where it is not time to change to the awake state (Step S738), the process returns to Step S733.

In a case where it is time to change to the awake state (Step S738), the control unit 250 changes the packet detection threshold value from the packet detection threshold value in the LPL state to the packet detection threshold value in the awake state (Step S739).

Subsequently, the control unit 250 determines whether the normal mode has been set (Step S740). Then, in a case where the normal mode has been set (Step S740), the control unit 250 ends the operation of the power saving standby process. On the other hand, in a case where the normal mode has not been set (Step S740), the process returns to Step S731. Note that Steps S731 to S740 are an example of a control process for changing the packet detection conditions in the claims.

As such, in a case where packets from other information processing apparatuses are detected when the packet detection threshold value (second packet detection threshold value) in the LPL state is used, the control unit 250 switches to use the first packet detection threshold value (the packet detection threshold value in the awake state). However, in a case where the detected packet is not a cancellation request packet (wake-up frame) to request the cancellation of the use of the packet detection threshold value in the LPL state (the cancellation of the LPL state), the control unit 250 continuously uses the packet detection threshold value in the LPL state.

[Example of Operation of Transmission Process (Slave Station)]

Figure 10:
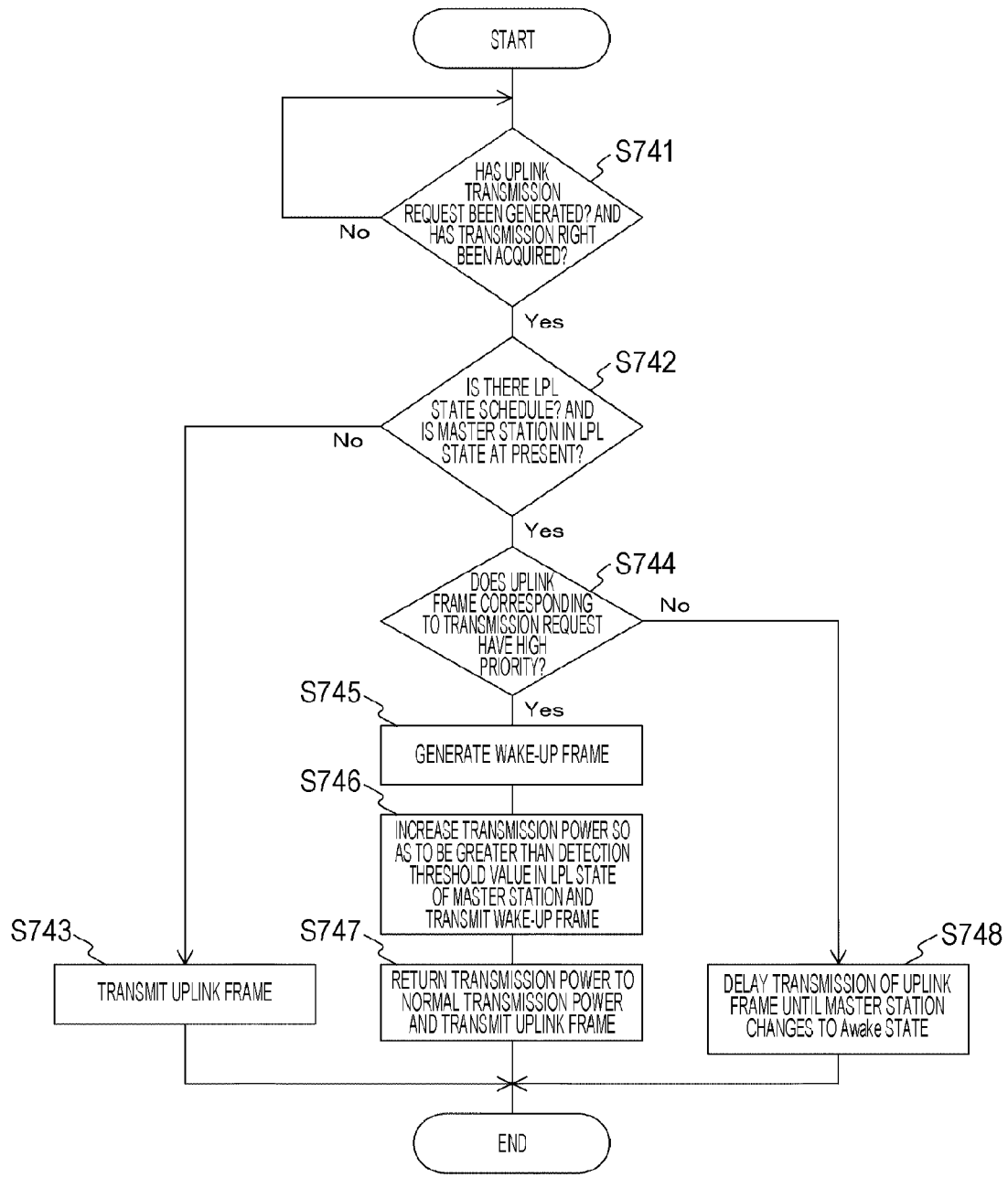
FIG. 10 is a flowchart illustrating an example of the procedure of a transmission process performed by the information processing apparatus 100 in the first embodiment of the present technology.

FIG. 10 is a flowchart illustrating an example of the procedure of the transmission process performed by the information processing apparatus 100 in the first embodiment of the present technology.

First, the control unit of the information processing apparatus 100 determines whether an uplink transmission request has been generated and a transmission right has been acquired (Step S741). Here, a state in which the transmission right has been acquired means a state in which an inter-frame space (IFS) waiting time and a random back-off time following the IFS waiting time in a carrier sense multiple access with collision avoidance (CSMA/CA) algorithm have expired and packets can be transmitted.

In a case where the uplink transmission request has not been generated or in a case where the uplink transmission request has been generated, but the transmission right has not been acquired (Step S741), the control unit continues to perform monitoring.

In a case where the uplink transmission request has been generated and the transmission right has been acquired (Step S741), the control unit of the information processing apparatus 100 determines whether the master station is in the LPL state (Step S742). For example, the control unit of the information processing apparatus 100 determines whether the master station is in the LPL state, on the basis of information (awake duration) related to the schedule of the awake state and the LPL state stored in the storage unit, with reference to the schedule of the LPL state.

In a case where the master station is not in the LPL state (in a case where the master station is in the awake state) (Step S742), the control unit of the information processing apparatus 100 transmits the frame (uplink frame) corresponding to the uplink transmission request (Step S743).

In a case where the master station is in the LPL state (Step S742), the control unit of the information processing apparatus 100 determines whether to delay the transmission of an uplink frame, on the basis of the priority of the uplink frame (Step S744).

Here, the type of access category label (AC) in IEEE802.11 or the value of user priority (UP) in IEEE802.1D can be used as the priority of the uplink frame. For example, in a case where the AC is AC_VO or AC_VI, it can be determined that the priority of the uplink frame is high. Furthermore, for example, in a case where the UP is equal to or greater than 4, it can be determined that the priority of the uplink frame is high. In addition, for example, it can be determined whether the priority of the uplink frame is high on the basis of the type of uplink frame. For example, in a case where the uplink frame is a management frame, it can be determined that the priority of the uplink frame is high.

In a case where the priority of the uplink frame is greater than a threshold value (Step S744), the control unit of the information processing apparatus 100 generates a wake-up frame (Step S745). Then, the control unit of the information processing apparatus 100 increases the transmission power so as to be greater than the packet detection threshold value in the LPL state of the master station and transmits the wake-up frame (Step S746).

Here, the wake-up frame is processed such that a reception level increases in the master station and is then transmitted such that the master station in which the packet detection threshold value is increased in the LPL state can receive the wake-up frame. In the first embodiment of the present technology, the frame of which the transmission power is increased so as to be greater than the packet detection threshold value in the LPL state is transmitted as the wake-up frame.

Specifically, the control unit of the information processing apparatus 100 determines the transmission power level that can be detected by the master station, on the basis of the propagation attenuation (estimated value) and the packet detection threshold value Th_LPL in the LPL state stored in the storage unit. Then, the control unit of the information processing apparatus 100 transmits the wake-up frame at the transmission power level that can be detected by the master station.

Here, the wake-up frame may be a dedicated frame or other frames (for example, a request-to-send (RTS) frame). In addition, since the wake-up frame is mainly used to return the master station to the awake state, it is preferable that the wake-up frame be a short frame.

Note that, in a case where BSS identification information or slave station identification information is stored in a PLCP layer of the wake-up frame, the range in which the reception level of the master station is increased (transmission power may be adjusted) may be limited to only a PLCP preamble portion.

Furthermore, the value of the increased transmission power may be stored in the wake-up frame in order to explicitly notify the master station that the wake-up frame has been transmitted.

As such, after the wake-up frame is transmitted, the master station is expected to return to the awake state. Therefore, the control unit of the information processing apparatus 100 returns the transmission power to the set value in the normal state and transmits an uplink frame (Step S747). In this case, in a case where there is a subsequent uplink frame scheduled to be transmitted, the control unit of the information processing apparatus 100 sets the More data bit in the frame control field to 1 and transmits the uplink frame. On the other hand, when the last uplink frame scheduled to be transmitted is transmitted, the control unit of the information processing apparatus 100 sets the More data bit to 0 and transmits the uplink frame.

In a case where the priority of the uplink frame is less than a threshold value (Step S744), the control unit of the information processing apparatus 100 delays the transmission of the wake-up frame until the master station changes to the awake state (Step S748). Note that Steps S741 to S748 are an example of the control of a process related to the transmission of packets described in the claims.

As such, the control unit of the information processing apparatus 100 controls the process related to the transmission of packets (for example, a packet transmission time, signal processing, and transmission power) on the basis of the notice from the master station that changes the packet detection conditions in a case where the power saving standby mode is set. For example, the control unit of the information processing apparatus 100 suppresses the transmission of packets while the second packet detection threshold value (the packet detection threshold value in the LPL state) is being used. However, in a case where there is a packet to be transmitted to the master station while the packet detection threshold value in the LPL state is used in the master station, the control unit of the information processing apparatus 100 transmits a cancellation request packet (wake-up frame) to request the cancellation of the use of the packet detection threshold value in the LPL state to the master station. In this case, the control unit of the information processing apparatus 100 transmits only a packet with priority that is greater than a threshold value to the master station while the packet detection threshold value in the LPL state is used.

For example, the control unit of the information processing apparatus 100 adjusts the wake-up frame such that the master station can detect the wake-up frame while the packet detection threshold value in the LPL state is being used and transmits the wake-up frame to the master station. That is, the control unit of the information processing apparatus 100 adjusts the transmission power of the wake-up frame such that a reception level is greater than the packet detection threshold value in the LPL state and transmits the wake-up frame to the master station. In this case, the control unit of the information processing apparatus 100 may insert information related to the transmission power into the wake-up frame and transmit the wake-up frame. In addition, the control unit of the information processing apparatus 100 may insert at least one of a network identifier of a network including the host apparatus and the master station and a terminal identifier of the host apparatus into the wake-up frame (for example, a physical layer and a data link layer) and transmit the wake-up frame.

As such, according to the first embodiment of the present technology, it is important for the master station to reduce power consumption and to appropriately stand by for the reception of data from the slave station. That is, it is possible to appropriately perform necessary uplink communication while reducing power consumption between the master station and the slave station.

2. SECOND EMBODIMENT

In the first embodiment of the present technology, the example in which the unit of one set of switching between the awake state and the LPL state in the power saving standby mode is the beacon interval has been described. In a second embodiment of the present technology, an example in which the unit (the unit of control of the LPL state) is different from the beacon interval will be described.

In addition, in the first embodiment of the present technology, the example in which, in a case where the wake-up frame is transmitted, transmission power is increased to increase the reception level has been described. In the second embodiment of the present technology, another example of the transmission of the wake-up frame will be described.

Note that the configuration of an information processing apparatus according to the second embodiment of the present technology is substantially the same as the configuration of the information processing apparatuses 100 to 103, 200, and 201 illustrated in, for example, FIG. 1. Therefore, the same components as those in the first embodiment of the present technology are denoted by the same reference numerals as those in the first embodiment of the present technology and a portion of the description of the components will not be repeated.

[Example of Format of Beacon Frame]

Figure 11:
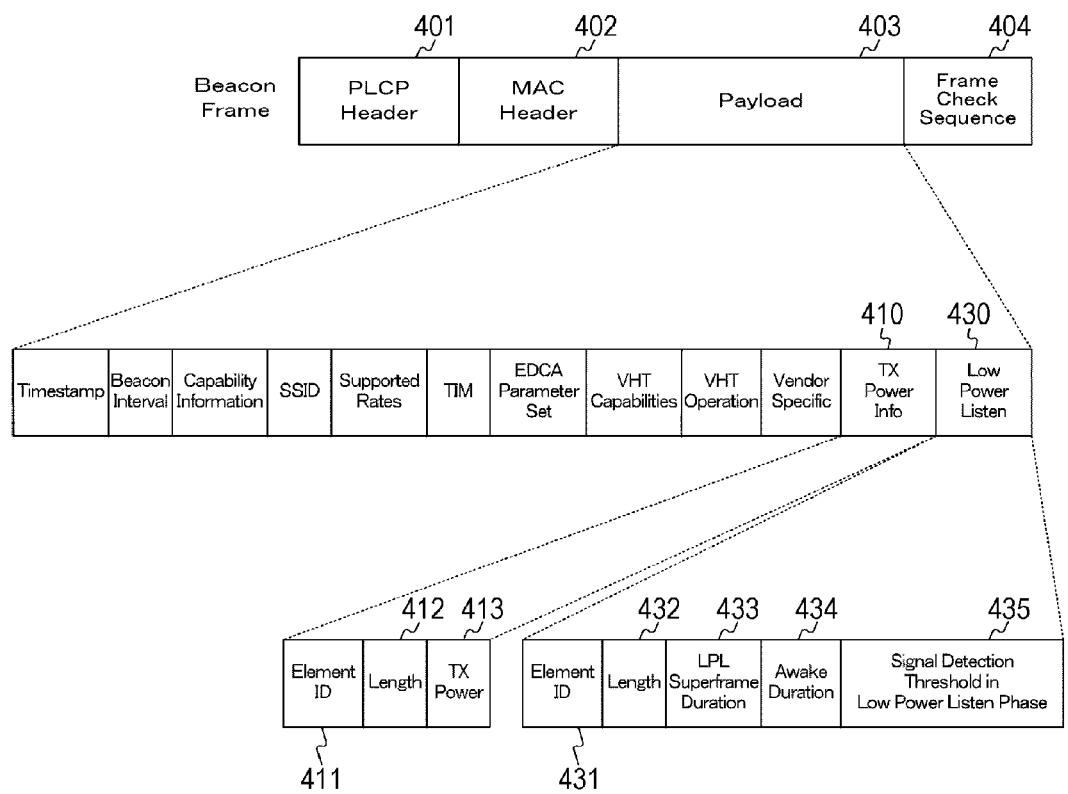
FIG. 11 is a diagram illustrating an example of the format of a beacon frame transmitted from an information processing apparatus 200 in a second embodiment of the present technology.

FIG. 11 is a diagram illustrating an example of the format of a beacon frame transmitted from an information processing apparatus 200 in the second embodiment of the present technology. Note that the beacon frame illustrated in FIG. 11 is the same as the beacon frame illustrated in FIG. 5 except that a part of the beacon frame is modified. Therefore, the same components as those in the beacon frame illustrated in FIG. 5 are denoted by the same reference numerals as those in FIG. 5 and a portion of the description of the components will not be repeated.

Payload 403 includes TX Power info 410 and Low Power Listen 430.

The Low Power Listen. 430 includes Element ID 431, Length 432, LPL Superframe Duration 433, Awake Duration 434, and Signal Detection Threshold in Low Power Listen Phase 435. In addition, the Low Power Listen 430 is a field that is added only in a case where a power saving standby mode is set in a master station.

Note that the Element ID 431, the Length 432, the Awake Duration 434, and the Signal Detection Threshold in Low Power Listen Phase 435 are similar to those illustrated in FIG. 5.

The LPL Superframe Duration 433 is a field that stores information (LPL superframe length) related to the unit of one set of switching between an awake state and an LPL state.

[Example of Power Saving Mode Change Determination Process]

A power saving mode change determination process in the second embodiment of the present technology is similar to that in the first embodiment of the present technology. Therefore, the description thereof will not be repeated here.

[Example of Operation of Power Saving Standby Parameter Determination and Notification Process]

A power saving standby parameter determination and notification process in the second embodiment of the present technology is substantially similar to that in the first embodiment of the present technology. However, as illustrated in FIG. 11, the power saving standby parameter determination and notification process in the second embodiment of the present technology differs from that in the first embodiment of the present technology in content notified by the beacon frame and the format of the beacon frame. Therefore, the difference from the first embodiment of the present technology will be described with reference to FIGS. 8 and 11.

The process similar to that in the first embodiment of the present technology is performed until an LPL state time rate L (a value in the range of 0 to 1) and a packet detection threshold value Th_LPL in the LPL state are determined.

As described above, in the second embodiment of the present technology, the unit of one set of switching between the awake state and the LPL state is set so to be different from the beacon interval. Therefore, the control unit 250 of the information processing apparatus 200 notifies the slave station of the unit (LPL Superframe) of one set of switching between the awake state and the LPL state, using the beacon frame (Step S722). In addition, the control unit 250 of the information processing apparatus 200 derives awake duration on the basis of the LPL state time rate L and an LPL superframe length.

Furthermore, the control unit 250 of the information processing apparatus 200 inserts other parameters (the packet detection threshold value in the LPL state and the awake duration) determined by the power saving standby parameter determination process into the beacon frame and transmits the beacon frame to the slave station under the control of the master station (Step S722). In addition, the master station inserts information related to transmission power used to transmit the beacon frame into the beacon frame and notifies the slave station of the information (Step S722).

In addition, the control unit of the information processing apparatus 100 acquires each parameter included in the received beacon frame and records each parameter in the storage unit (Step SS724).

Note that, in the second embodiment of the present technology, the example in which each parameter is inserted into the beacon frame and the beacon frame is transmitted to the slave stations under the control of the master station has been described. However, each parameter may be notified to the slave stations under the control of the master station by different types of frames.

[Example of Power Saving Standby Process (Master Station)]

A power saving standby process (master station) in the second embodiment of the present technology is the same as that in the first embodiment of the present technology. Therefore, the description thereof will not be repeated here.

[Example of Operation of Transmission Process (Slave Station)]

Figure 12:
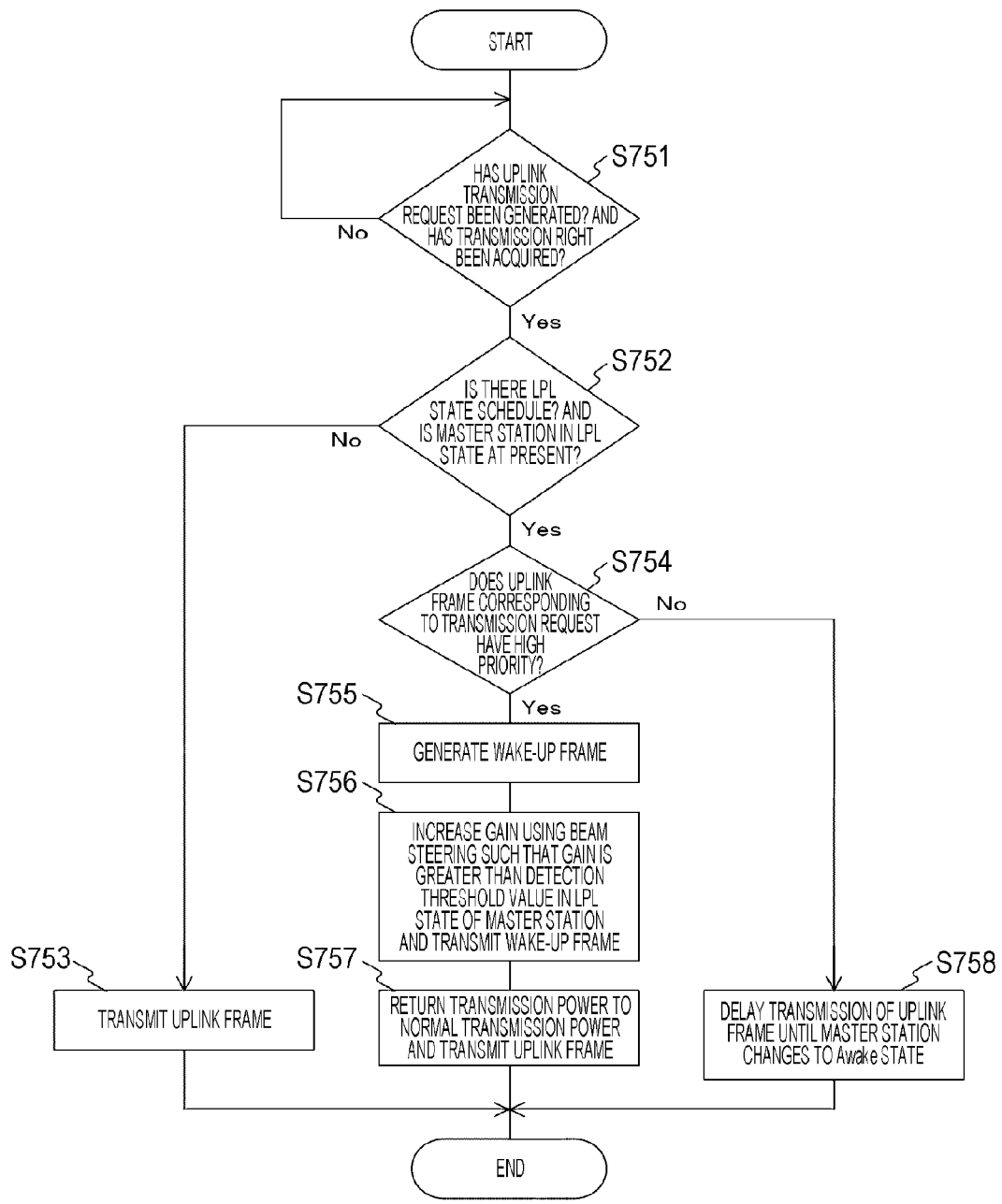
FIG. 12 is a flowchart illustrating an example of the procedure of a transmission process performed by an information processing apparatus 100 in the second embodiment of the present technology.

FIG. 12 is a flowchart illustrating an example of the procedure of a transmission process performed by the information processing apparatus 100 in the second embodiment of the present technology. Note that FIG. 12 is a modification example of FIG. 10. Therefore, a portion of the description of the same components as those in the example illustrated in FIG. 10 will not be repeated.

The procedure (Steps S751 to S755, S757, and S758) illustrated in FIG. 12 corresponds to the procedure (Steps S741 to S745, S747, and S748) illustrated in FIG. 10.

In a case where the priority of an uplink frame is greater than a threshold value (Step S754), the control unit of the information processing apparatus 100 generates awake-up frame (Step S755) and transmits the wake-up frame (Step S756).

Here, in the second embodiment of the present technology, as a process for increasing a reception level, the master station increases the reception level, using the gain of beam steering by a plurality of antennas, without increasing transmission power (Step S756). In addition, an antenna weight used for beam steering can be calculated using the past reception from the master station (for example, the reception of the beacon frame).

Note that, in a case where BSS identification information or slave station identification information is stored in a PLCP layer of the wake-up frame, the range in which the reception level of the master station is increased (the range in which beam steering is performed) may be limited to only a PLCP preamble portion. In this case, information indicating that beam steering is performed may be stored in the frame such that the master station recognizes that the reception level is changed in the frame.

As such, the control unit of the information processing apparatus 100 can increase the gain, using beam steering, such that the gain is greater than the packet detection threshold value in the LPL state and transmit the wake-up frame to the master station. In this case, the control unit of the information processing apparatus 100 may insert information for notifying that beam steering has been performed into the wake-up frame and transmit the wake-up frame.

Furthermore, both adjustment by transmission power according to the first embodiment of the present technology and adjustment by beam steering according to the second embodiment of the present technology may be used.

3. THIRD EMBODIMENT

In the first and second embodiments of the present technology, the example in which the awake state and the LPL state are periodically switched in the power saving standby mode has been described. In a third embodiment of the present technology, an example in which a master station determines the switching and notifies a slave station of the determination result will be described.

Note that the configuration of an information processing apparatus according to the third embodiment of the present technology is substantially the same as the configuration of the information processing apparatuses 100 to 103, 200, and 201 illustrated in, for example, FIG. 1. Therefore, the same components as those in the first embodiment of the present technology are denoted by the same reference numerals as those in the first embodiment of the present technology and a portion of the description thereof will not be repeated.

[Example of Format of State Change Notification Frame]

Figure 13:
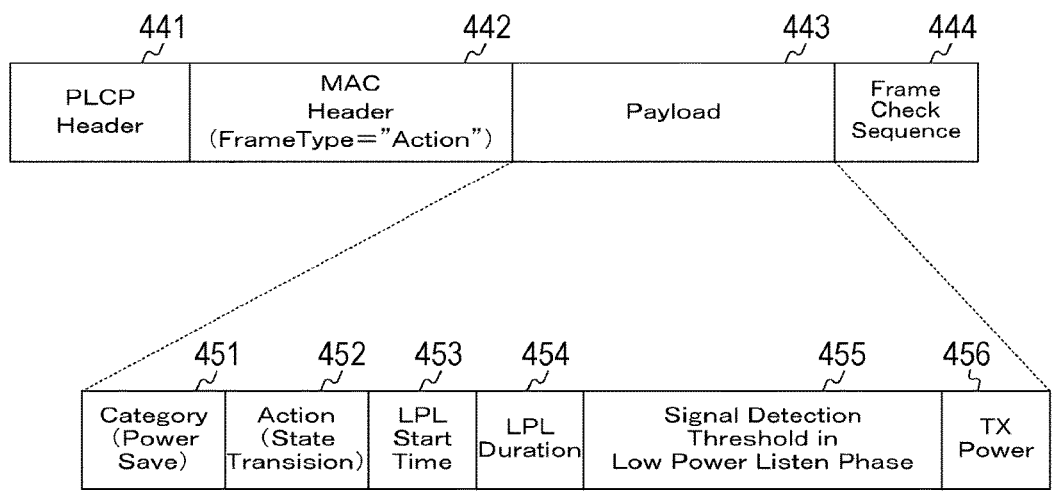
FIG. 13 is a diagram illustrating an example of the format of a state change notification frame transmitted from an information processing apparatus 200 in a third embodiment of the present technology.

FIG. 13 is a diagram illustrating an example of the format of a state change notification frame transmitted from an information processing apparatus 200 in the third embodiment of the present technology.

The state change notification frame includes PLCP Header 441, MAC Header 442, Payload 443, and Frame Check Sequence (FCS) 444.

The Payload 443 includes Category 451, Action 452, LPL Start Time 453, LPL Duration 454, Signal Detection Threshold in Low Power Listen Phase 455, and TX Power 456.

The Category 451 is a field that stores information indicating the state change notification frame.

The Action 452 is a field that stores the notice of change to the LPL state.

The LPL Start Time 453 is a field that stores the start time of the LPL state. Note that, in a case where the time when the state change notification frame is transmitted can be used as the start time of the LPL state, the LPL Start Time 453 can be omitted.

The LPL Duration 454 is a field that stores the duration of the LPL state.

The Signal Detection Threshold in Low Power Listen Phase 455 is a field that stores the packet detection threshold value in the LPL state in a case where the power saving standby mode is set.

The TX Power 456 is a field that stores information related to transmission power used to transmit the state change notification frame. Note that the TX Power 456 may be omitted.

[Example of Power Saving Mode Change Determination Process]

A power saving mode change determination process in the third embodiment of the present technology is similar to that in the first embodiment of the present technology. Therefore, the description thereof will not be repeated here.

[Example of Power Saving Standby Parameter Determination and Notification Process]

A power saving standby parameter determination process in the third embodiment of the present technology is substantially similar to that in the first embodiment of the present technology. However, each parameter determined by the power saving standby parameter determination process is not transmitted to the slave station by the beacon frame illustrated in FIG. 5. Note that the Tx Power info 410 in the beacon frame illustrated in FIG. 5 may be notified to the slave station. In this case, the Low Power Listen 420 in the beacon frame illustrated in FIG. 5 is not added.

Furthermore, the master station stores the schedule information of the LPL state determined by the power saving standby parameter determination process in its storage unit.

[Example of Operation of Power Saving Standby Process (Master Station)]

Figure 14:
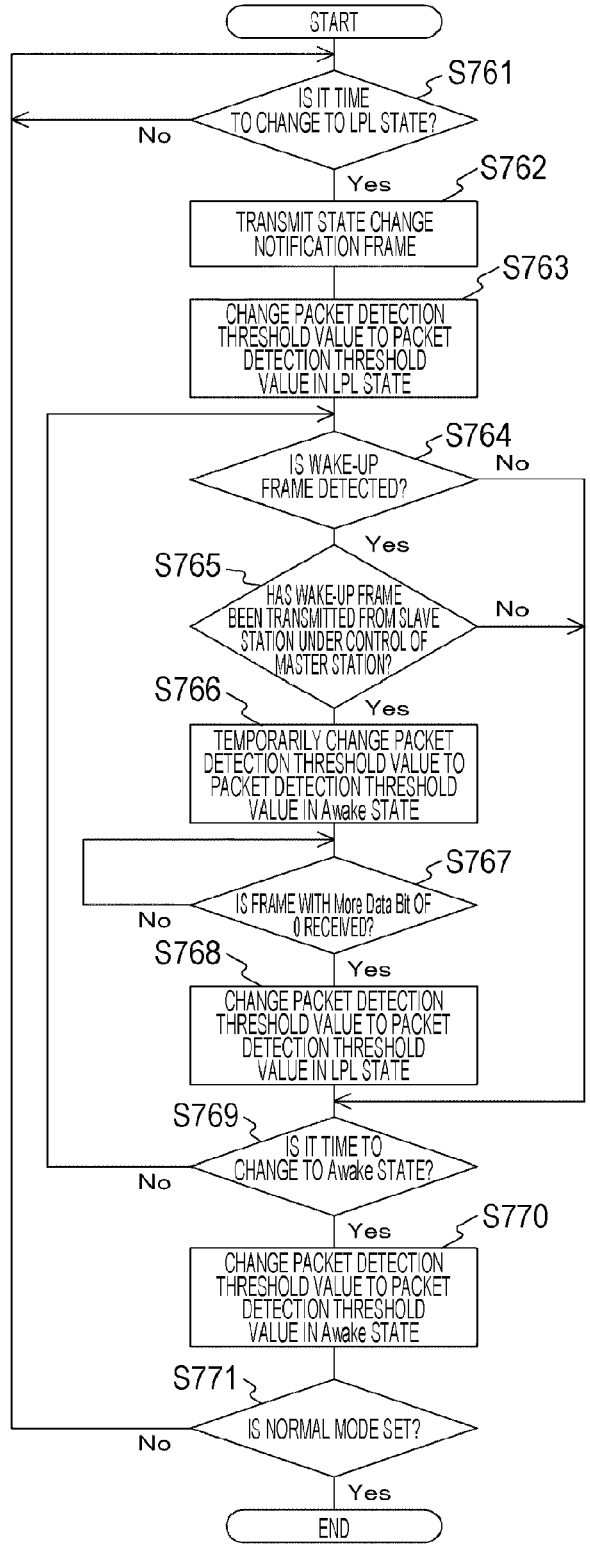
FIG. 14 is a flowchart illustrating an example of the procedure of a power saving standby process performed by the information processing apparatus 200 in the third embodiment of the present technology.

FIG. 14 is a flowchart illustrating an example of the procedure of a power saving standby process performed by the information processing apparatus 200 in the third embodiment of the present technology. Note that FIG. 14 is a modification example of FIG. 9. Therefore, a portion of the description of the same components as those in the example illustrated in FIG. 9 will not be repeated.

The procedure (Steps S761 and S763 to S771) illustrated in FIG. 14 corresponds to the procedure (Steps S731 to S740) illustrated in FIG. 9.

In a case where it is time to change to the LPL state (Step S761), the control unit 250 of the information processing apparatus 200 transmits a state change notification frame to the slave station under the control of the information processing apparatus 200 (Step S762). For example, the control unit 250 transmits the state change notification frame illustrated in FIG. 13. As such, the master station transmits the state change notification frame to the slave station under the control of the master station before changing to the LPL state. Then, after transmitting the state change notification frame, the master station changes to the LPL state.

[Example of Operation of Transmission Process (Slave Station)]

Figure 15:
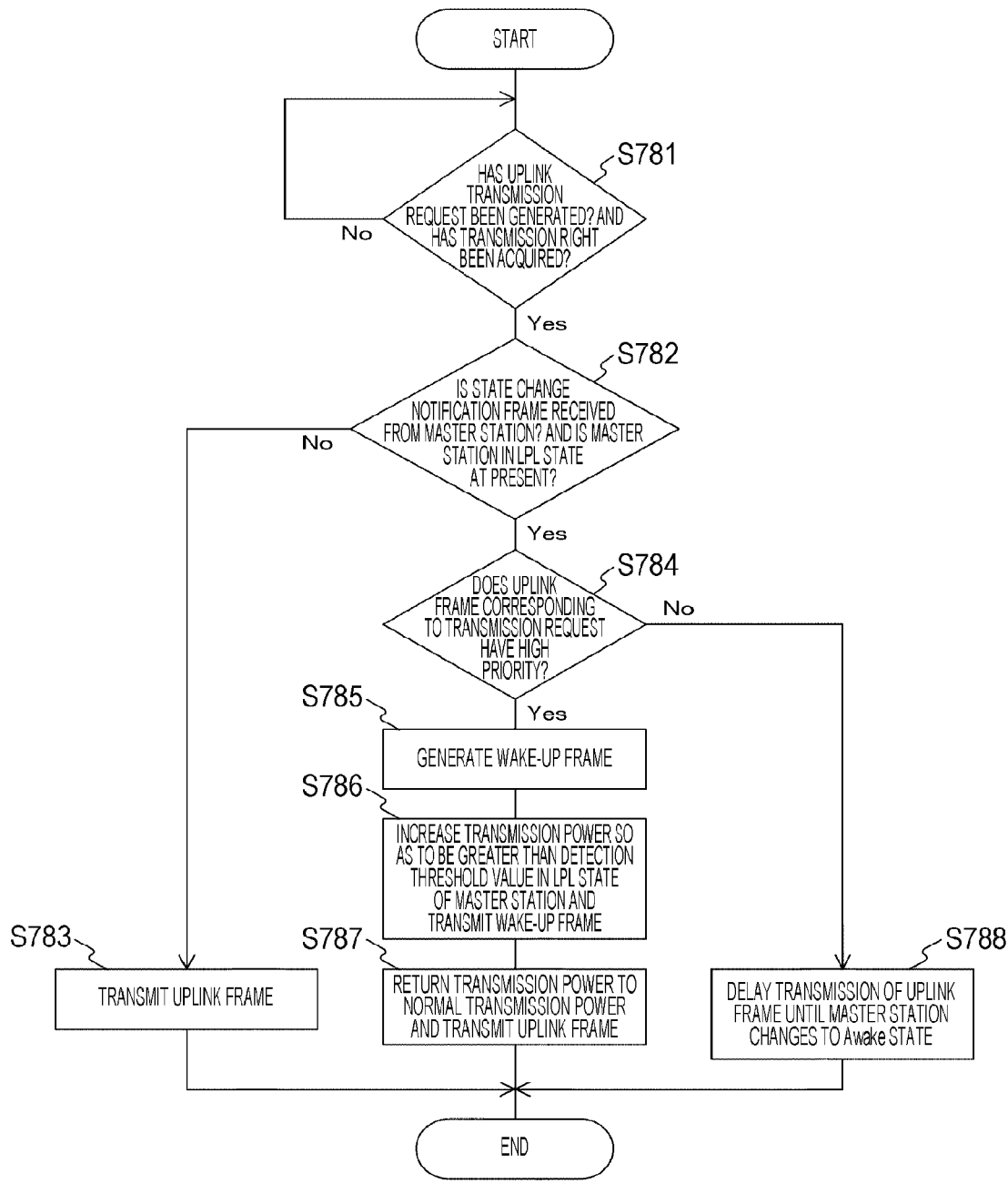
FIG. 15 is a flowchart illustrating an example of the procedure of a transmission process performed by an information processing apparatus 100 in the third embodiment of the present technology.

FIG. 15 is a flowchart illustrating an example of the procedure of a transmission process performed by the information processing apparatus 100 in the third embodiment of the present technology. Note that FIG. 15 is a modification example of FIG. 10. Therefore, a portion of the description of the same components as those in the example illustrated in FIG. 10 will not be repeated.

The procedure (Steps S781 and S783 to S788) illustrated in FIG. 15 corresponds to the procedure (Steps S741 and S743 to S748) illustrated in FIG. 10.

In a case where an uplink transmission request has been generated and a transmission right has been acquired (Step S781), the control unit of the information processing apparatus 100 receives the state change notification frame from the master station and determines whether the master station is in the LPL state (Step S782). For example, the control unit of the information processing apparatus 100 can determine whether the master station is in the LPL state, on the basis of each information item included in the state change notification frame. For example, the control unit can determine whether the master station is in the LPL state, on the basis of the start time of the LPL state (LPL Start Time 453) and the duration of the LPL state (LPL Duration 454) included in the state change notification frame.

As such, the third embodiment of the present technology differs from the first embodiment of the present technology in a means for obtaining information for determining the period for which the master station is in the LPL state. In addition, a process related to transmission can be similar to that in the first embodiment of the present technology. Furthermore, for the process related to transmission, the same process as that in the second embodiment of the present technology may be applied.

As such, in the third embodiment of the present technology, switching between the awake state and the LPL state is not periodically performed in the master station and the master station changes to the states with different durations on the basis of the determination result of the master station.

4. FOURTH EMBODIMENT

In the first to third embodiments of the present technology, the example in which, in a case where the master station is in the LPL state, the wake-up frame is transmitted and the uplink frame is transmitted has been described. However, in a fourth embodiment of the present technology, an example in which the transmission of the wake-up frame is omitted will be described.

Note that the configuration of an information processing apparatus according to the fourth embodiment of the present technology is substantially the same as the configuration of the information processing apparatuses 100 to 103, 200, and 201 illustrated in, for example, FIG. 1. Therefore, the same components as those in the first embodiment of the present technology are denoted by the same reference numerals as those in the first embodiment of the present technology and a portion of the description thereof will not be repeated.

Note that a power saving mode change determination process, a power saving standby parameter determination and notification process, and a power saving standby process (master station) in the fourth embodiment of the present technology are similar to those in the first embodiment of the present technology. Therefore, the description thereof will not be repeated here.

[Example of Operation of Transmission Process (Slave Station)]

Figure 16:
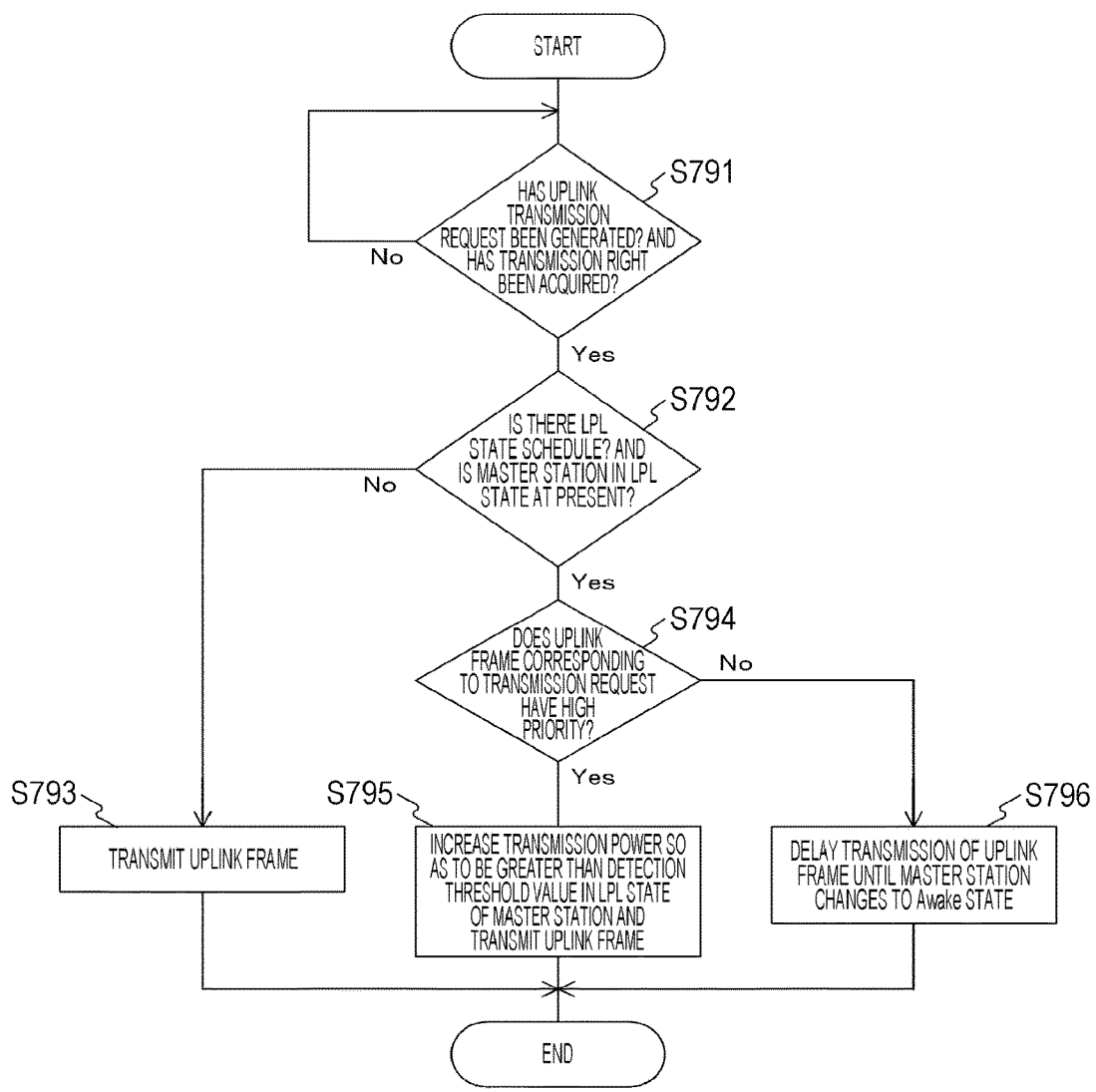
FIG. 16 is a flowchart illustrating an example of the procedure of a transmission process performed by an information processing apparatus 100 in a fourth embodiment of the present technology.

FIG. 16 is a flowchart illustrating an example of the procedure of a transmission process performed by the information processing apparatus 100 in the fourth embodiment of the present technology. Note that FIG. 16 is a modification example of FIG. 10. Therefore, a portion of the description of the same components as those in the example illustrated in FIG. 10 will not be repeated.

The procedure (Steps S791 to S794 and S796) illustrated in FIG. 16 corresponds to the procedure (Steps S741 to S744 and S748) illustrated in FIG. 10.

In a case where the priority of an uplink frame is greater than a threshold value (Step S794), the control unit of the information processing apparatus 100 transmits the uplink frame (Step S795). In this case, the control unit of the information processing apparatus 100 increases transmission power so as to be greater than the packet detection threshold value in the LPL state of the master station and transmits the uplink frame (Step S795).

Note that, in a case where there are a plurality of uplink frames, the control unit may return the transmission power to normal transmission power and transmit the second and subsequent uplink frames. Furthermore, for a method for increasing a reception level in the master station, a process related to beam steering may be applied as in the second embodiment of the present technology.

As such, in the fourth embodiment of the present technology, in uplink transmission from the slave station in the LPL state, the transmission of the wake-up frame is omitted and the uplink frame is transmitted as the wake-up frame. Therefore, it is possible to simplify the process of the slave station.

5. FIFTH EMBODIMENT

In the first to fourth embodiments of the present technology, the example in which the awake state and the LPL state are switched in the power saving standby mode has been described. In a fifth embodiment of the present technology, an example in which the master station is always in the LPL state in the power saving standby mode will be described.

Note that the configuration of an information processing apparatus according to the fifth embodiment of the present technology is substantially the same as the configuration of the information processing apparatuses 100 to 103, 200, and 201 illustrated in, for example, FIG. 1. Therefore, the same components as those in the first embodiment of the present technology are denoted by the same reference numerals as those in the first embodiment of the present technology and a portion of the description thereof will not be repeated.

[Example of Format of Beacon Frame]

Figure 17:
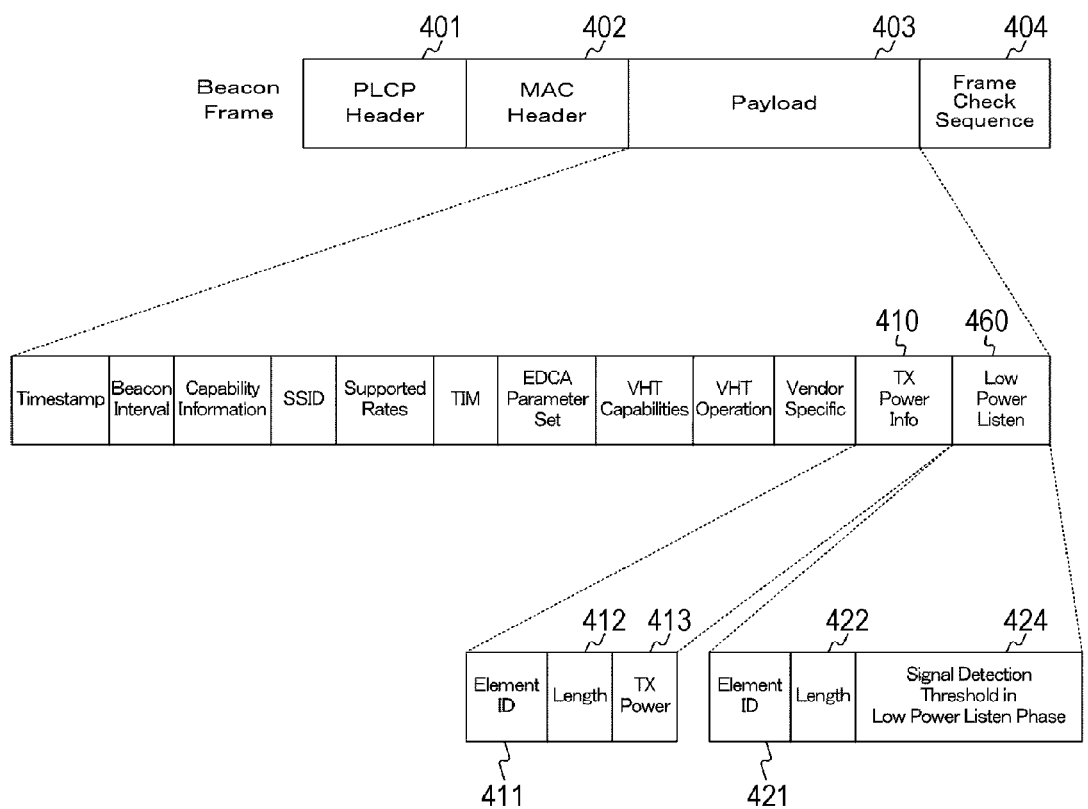
FIG. 17 is a diagram illustrating an example of the format of a beacon frame transmitted from an information processing apparatus 200 in a fifth embodiment of the present technology.

FIG. 17 is a diagram illustrating an example of the format of a beacon frame transmitted from the information processing apparatus 200 in the fifth embodiment of the present technology.

Note that the beacon frame illustrated in FIG. 17 is similar to the beacon frame illustrated in FIG. 5 except that apart of the beacon frame is omitted. Specifically, the Awake Duration 423 in the Low Power Listen 420 illustrated in FIG. 5 is omitted. Therefore, the same components as those in the beacon frame illustrated in FIG. 5 are denoted by the same reference numerals as those in FIG. 5 and a portion of the description thereof will not be repeated.

[Example of Power Saving Mode Change Determination Process]

A power saving mode change determination process in the fifth embodiment of the present technology is similar to that in the first embodiment of the present technology. Therefore, the description thereof will not be repeated here.

[Example of Operation of Power Saving Standby Parameter Determination and Notification Process]

FIG. 18 is a flowchart illustrating an example of the procedure of a power saving standby parameter determination and notification process performed by the information processing apparatuses 100 and 200 in the fifth embodiment of the present technology. Note that FIG. 18 is a modification example of FIG. 8. Therefore, a portion of the description of the same components as those in the example illustrated in FIG. 8 will not be repeated.

FIG. 18 illustrates an example in which the information processing apparatus (master station) 200 determines to change to a power saving standby mode and then determines each parameter related to the power saving standby mode. Specifically, FIG. 18 illustrates an example in which the master station determines only the packet detection threshold value in the LPL state as each parameter related to the power saving standby mode.

First, the control unit 250 of the information processing apparatus 200 determines the packet detection threshold value in the LPL state (Step S801). Here, a case where the master station is always in the LPL state in the power saving standby mode corresponds to a case where L is 1 in the above-mentioned Expression 1. In this case, it is possible to simplify the content of notification from the master station to the slave station.

That is, the control unit 250 of the information processing apparatus 200 stores the determined parameters (the packet detection threshold value Th_LPL in the LPL state) in a beacon frame and notifies the beacon frame to the slave station under the control of the information processing apparatus 200 (Step S802). In this case, the control unit 250 stores information related to transmission power used to transmit the beacon frame in the beacon frame and notifies the beacon frame (Step S802). For example, as illustrated in FIG. 17, transmission power information and the packet detection threshold value in the LPL state are stored in the beacon frame. It is possible to omit information related to the schedule of the awake state and the LPL state.

In addition, the information processing apparatus 100 receives the beacon frame transmitted from the information processing apparatus 200 (Step S803). In this case, the control unit of the information processing apparatus 100 can determine whether the information processing apparatus 200 has changed to the power saving standby mode, on the basis of whether the received beacon frame includes Low Power Listen 460 (illustrated in FIG. 17).

FIG. 18 illustrates an example in which the information processing apparatus 200 inserts the Low Power Listen 460 (illustrated in FIG. 17) into the beacon frame and transmits the beacon frame. Therefore, the control unit of the information processing apparatus 100 can check whether the information processing apparatus 200 has changed to the power saving standby mode on the basis of the received beacon frame. In addition, after detecting the change to the power saving standby mode, the control unit of the information processing apparatus 100 determines that the information processing apparatus 200 is always in the LPL state until a beacon frame without including the Low Power Listen 460 is received.

Then, the control unit of the information processing apparatus 100 acquires each parameter (the packet detection threshold value Th_LPL in the LPL state) included in the received beacon frame and stores each parameter in the storage unit (Step SS804). In addition, the control unit of the information processing apparatus 100 estimates propagation attenuation on the basis of the reception intensity (reception level) of the received beacon frame and transmission power information stored in Tx Power 413 (illustrated in FIG. 17) of the beacon frame. Then, the control unit of the information processing apparatus 100 records the estimated propagation attenuation in the storage unit.

Note that, similarly to the first embodiment of the present technology, the frame used is not limited to the beacon frame and other frames may be used to notify each information item.

[Example of Operation of Power Saving Standby Process (Master Station)]

Figure 19:
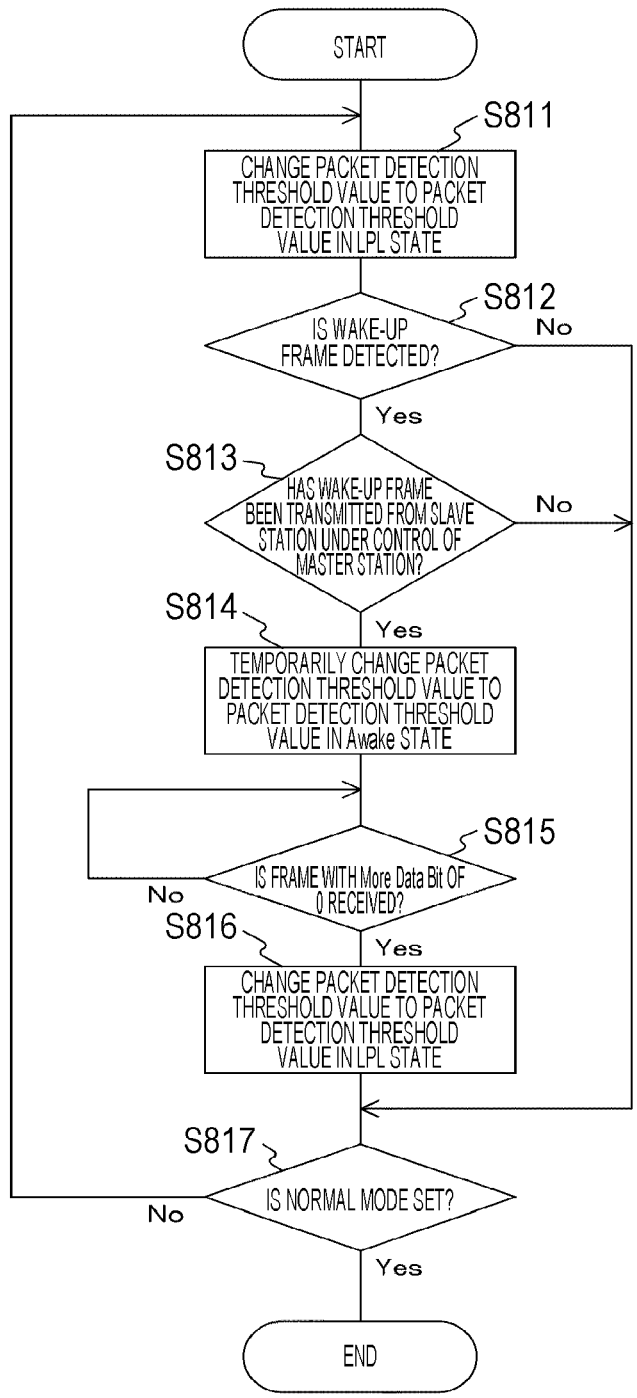
FIG. 19 is a flowchart illustrating an example of the procedure of a power saving standby process performed by the information processing apparatus 200 in the fifth embodiment of the present technology.

FIG. 19 is a flowchart illustrating an example of the procedure of a power saving standby process performed by the information processing apparatus 200 in the fifth embodiment of the present technology. Note that FIG. 19 is a modification example of FIG. 9. Therefore, a portion of the description of the same components as those in the example illustrated in FIG. 9 will not be repeated.

The procedure (Steps S811 to S817) illustrated in FIG. 19 corresponds to the procedure (Steps S732 to S737 and S740) illustrated in FIG. 9.

As such, in the fifth embodiment of the present technology, the LPL state is always maintained except a case where a wake-up frame is received and the operation state is temporarily changed to the awake state.

[Example of Operation of Transmission Process (Slave Station)]

Figure 20:
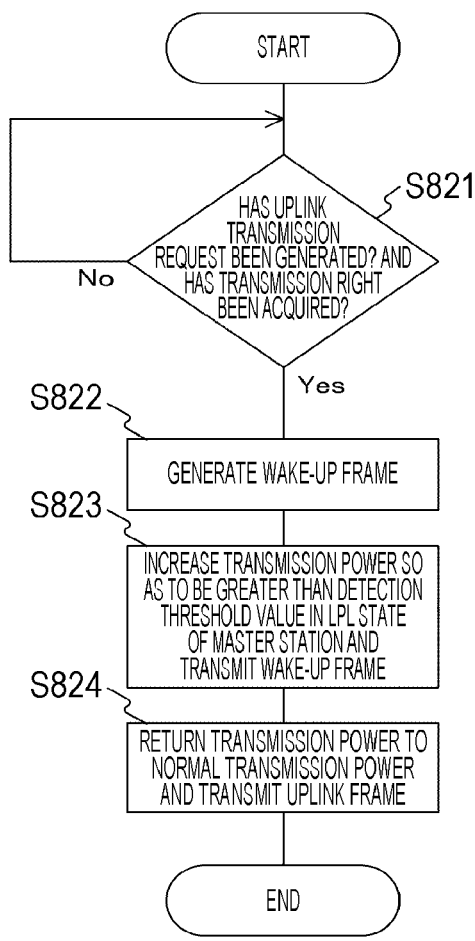
FIG. 20 is a flowchart illustrating an example of the procedure of a transmission process performed by the information processing apparatus 100 in the fifth embodiment of the present technology.

FIG. 20 is a flowchart illustrating an example of the procedure of a transmission process performed by the information processing apparatus 100 in the fifth embodiment of the present technology. Note that FIG. 20 is a modification example of FIG. 10. Therefore, a portion of the description of the same components as those in the example illustrated in FIG. 10 will not be repeated.

The procedure (Steps S821 to S824) illustrated in FIG. 19 corresponds to the procedure (Steps S741 and S745 to S747) illustrated in FIG. 10.

As such, in a case where an uplink transmission request is generated and a transmission right is acquired, the slave station transmits an uplink frame after transmitting the wake-up frame, without being aware of the schedule of the state of the master station.

Note that, for a method for transmitting the wake-up frame, a method using beam steering may be used, as described in the second embodiment of the present technology. In addition, the uplink frame may be used as the wake-up frame, as described in the fourth embodiment of the present technology.

In addition, as described in the third embodiment of the present technology, notification to the slave station using the beacon frame may be omitted and a state change notification frame may be transmitted to notify the slave station of information at the moment when the operation mode is changed to the LPL state. An example of the format of the state change notification frame is illustrated in FIG. 21.

[Example of Format of State Change Notification Frame]

Figure 21:
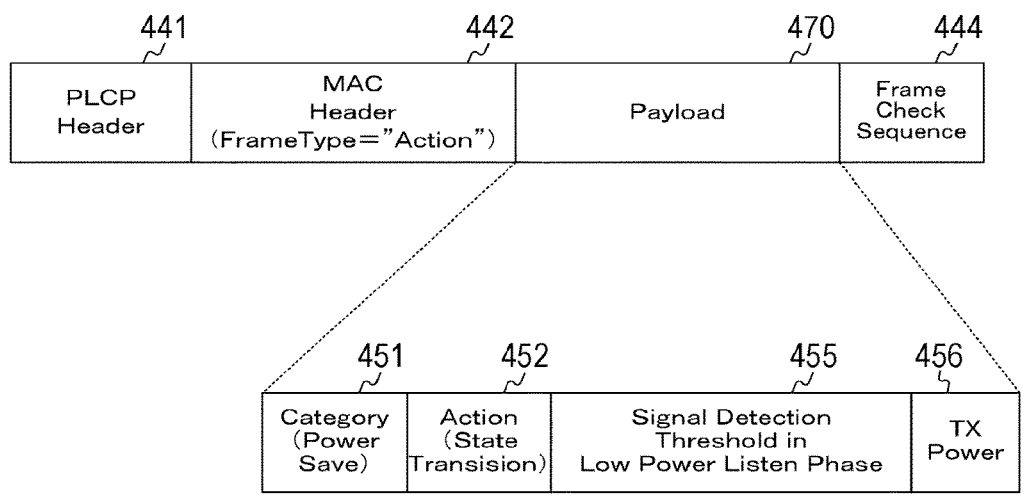
FIG. 21 is a diagram illustrating an example of the format of a state change notification frame transmitted from the information processing apparatus 200 in the fifth embodiment of the present technology.

FIG. 21 is a diagram illustrating an example of the format of the state change notification frame transmitted from the information processing apparatus 200 in the fifth embodiment of the present technology.

Note that the state change notification frame illustrated in FIG. 21 is similar to the state change notification frame illustrated in FIG. 13 except that a portion of the state change notification frame is omitted. Specifically, the LPL Start Time 453 and the LPL Duration 454 illustrated in FIG. 13 are omitted. Therefore, the same components as those in the state change notification frame illustrated in FIG. 13 are denoted by the same reference numerals as those in FIG. 13 and a portion of the description thereof will not be repeated.

As such, in the fifth embodiment of the present technology, it is possible to simplify information stored in the state change notification frame.

Here, in the related art, the standard related to the structure in which a slave station performs a sleep operation has been extended. However, basically, it is difficult for a master station, which needs to always stand by for uplink transmission from the slave station under the control of the master station, to change to a sleep state. In particular, in a high-density environment with large interference, the master station in a standby state frequently changes to a reception state due to a large number of incoming packets from an overlap BSS (OBSS) even when the amount of communication is small in the host cell and is forced to consume power for reception. For example, in general, power required in the reception state is about two times more than that in the standby state. In addition, in recent years, the use of a mobile access point (AP) has increased. It is important to reduce the power consumption of the master station.

In addition, in a Wi-Fi P2P standard, a master station can change to a sleep mode according to a predetermined schedule and rule. However, since the master station does not receive any data in the sleep mode, it is difficult for a slave station corresponding to the function to transmit data in the sleep mode. As such, while the master station is in the sleep mode, it is difficult to perform uplink transmission. As a result, there is a concern that uplink transmission will be delayed in urgent situations.

In contrast, in the first to fifth embodiments of the present technology, the master station switches the operation mode from the normal mode to the power saving standby mode in response to a power saving request from the upper layer. Then, in the power saving standby mode, the master station increases the packet detection threshold value to make it difficult to detect packets, thereby reducing reception power. In addition, the master station notifies its slave station of the schedule information of the LPL state and the packet detection threshold value. Furthermore, the slave station under the control of the master station can perform signal processing on the basis of the information to perform urgent uplink transmission while the master station is in the LPL state. Therefore, it is possible to reduce the power consumption of the master station and to improve flexibility in the uplink transmission time from the slave station.

That is, in the first to fifth embodiments of the present technology, the power saving standby mode in which the packet detection threshold value is adjusted according to predetermined conditions, such as a remaining battery level, is set in the master station based on IEEE802.11ax and the master station can provide signal processing for achieving the LPL state to the slave station.

As such, according to the embodiments of the present technology, in a random access communication system, the master station can reduce power consumption during an operation and can stand by for important packets from the slave station.

In addition, each process (each process for reducing power consumption during an operation) of the master station described in the first to fifth embodiments of the present technology may be applied to the slave station. That is, the slave station may use each process (each process for reducing power consumption during an operation) of the master station in order to reduce power consumption during an operation. In this case, the power saving standby mode can be set in the slave station, similarly to the master station.

As such, in a case where the first to fifth embodiments of the present technology are applied to the slave station, instead of the beacon frame, other frames (for example, a unicast management frame) are used for notification. In addition, uplink and downlink can be switched to achieve the exchange between the master station and the slave station described in the first to fifth embodiments of the present technology.

Furthermore, in the first to fifth embodiments of the present technology, only a portion related to a reduction in the power consumption (power saving) of the master station has been described. However, the structure for reducing the power consumption of the slave station, which is based on the standard according to the related art, may be achieved at the same time as the structure for reducing the power consumption of the master station.

In addition, each embodiment of the present technology, an example in which a plurality of information processing apparatuses have a master-salve relationship therebetween has been described. However, each embodiment of the present technology can be applied to a structure in which a plurality of information processing apparatuses are connected in an equal relationship as in a mesh network.

6. APPLICATION EXAMPLES

The present disclosure can be applied to various products. For example, the information processing apparatuses 100 to 103, 200, and 201 may be implemented as mobile terminals, such as smart phones, tablet personal computers (PCs), notebook PCs, portable game terminals, or digital cameras, fixed terminals, such as television sets, printers, digital scanners, or network storages, or in-vehicle terminals such as car navigation apparatuses. In addition, the information processing apparatuses 100 to 103, 200, and 201 may be implemented as terminals which performs machine-to-machine (M2M) communication (which are al so referred to as machine-type communication (MTC) terminals), such as smart meters, vending machines, remote monitoring apparatuses, or point-of-sale (POS) terminals. Furthermore, the information processing apparatuses 100 to 103, 200, and 201 may be wireless communication modules (for example, integrated circuit modules each of which is configured by one die) provided in these terminals.

On the other hand, for example, the information processing apparatuses 200 and 201 may be implemented by wireless LAN access points (which are also referred to as wireless base stations) with a router function or without a router function. In addition, the information processing apparatuses 200 and 201 may be implemented as mobile wireless LAN routers. Furthermore, the information processing apparatuses 200 and 201 may be wireless communication modules (for example, integrated circuit modules each of which is configured by one die) provided in these terminals.

6-1. First Application Example

Figure 22:
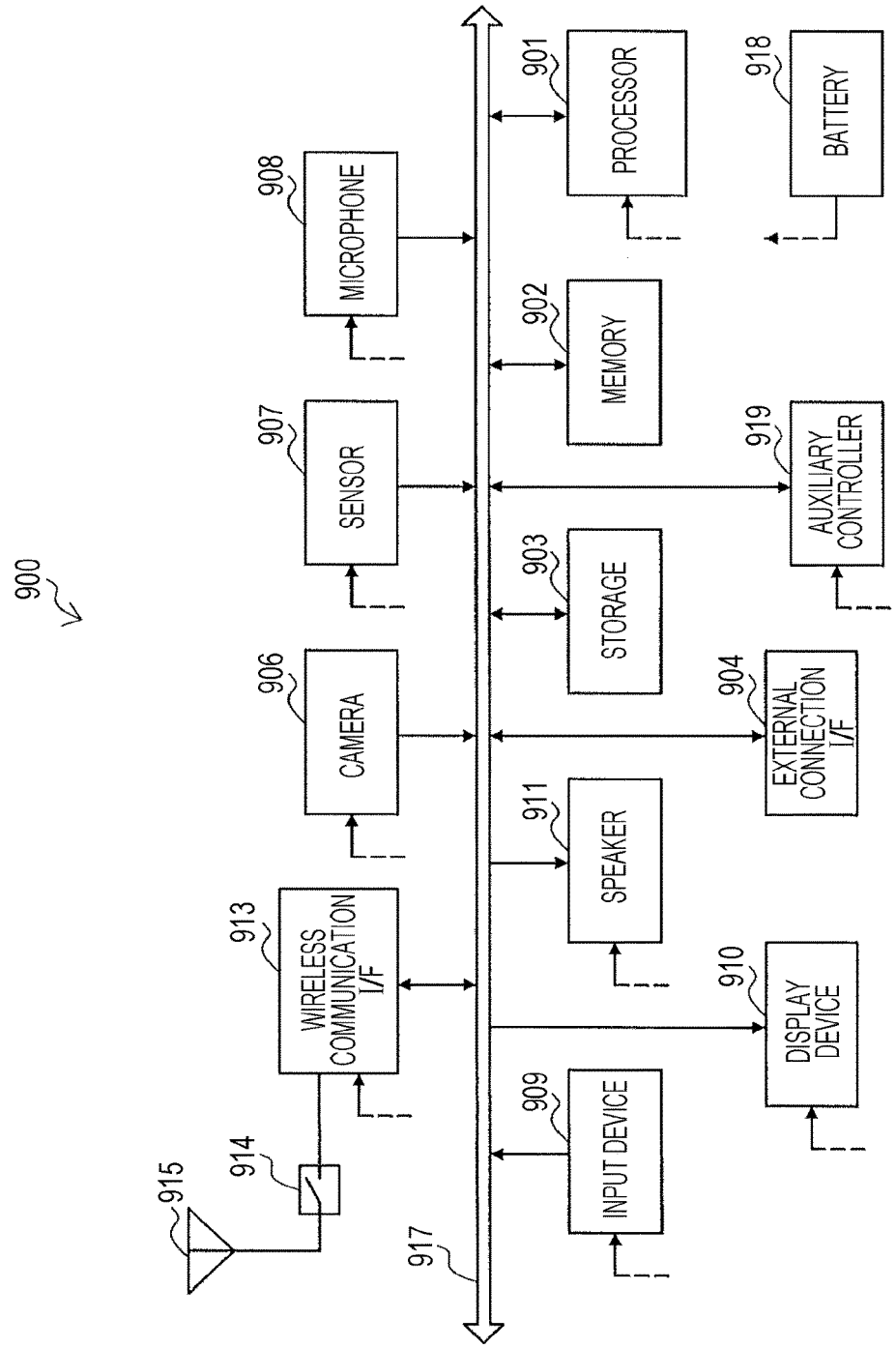
FIG. 22 is a block diagram illustrating an example of the schematic configuration of a smart phone.

FIG. 22 is a block diagram illustrating an example of the schematic configuration of a smart phone 900 to which the present disclosure can be applied. The smart phone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC) and controls the functions of an application layer and other layers of the smart phone 900. The memory 902 includes a random access memory (RAM) and a read only memory (ROM) and stores a program and data executed by the processor 901. The storage 903 may include a storage medium, such as a semiconductor memory or a hard disk. The external connection interface 904 is an interface for connecting an external device, such as a memory card or a universal serial bus (USB) device, to the smart phone 900.

The camera 906 includes an imaging element, such as a charge coupled device (CCD) and a complementary metal oxide semiconductor (CMOS) sensor, and generates a captured image. The sensor 907 may include a group of sensors, such as a positioning sensor, a gyro sensor, a geomagnetic sensor, and an acceleration sensor. The microphone 908 converts a voice that is input to the smart phone 900 into an audio signal. The input device 909 includes, for example, a touch sensor that detects a touch on a screen of the display device 910, a keypad, a keyboard, a button, or a switch and receives an operation or an information input from a user. The display device 910 includes a screen, such as a liquid crystal display (LCD) or an organic light-emitting diode (OLED) display, and displays an output image from the smart phone 900. The speaker 911 converts the audio signal that is output from the smart phone 900 into a voice.

The wireless communication interface 913 supports one or more of the wireless LAN standards, such as IEEE 802.11a, 11b, 11g, 11n, 11ac, and 11ad, and performs wireless communication. The wireless communication interface 913 can communicate with other apparatuses through a wireless LAN access point in an infrastructure mode. In addition, the wireless communication interface 913 can directly communicate with other apparatuses in an ad hoc mode or a direct communication mode such as Wi-Fi Direct. Note that, in Wi-Fi Direct, unlike the ad-hoc mode, one of two terminals operates as an access point and communication is directly performed between the terminals. The wireless communication interface 913 can typically include, for example, a baseband processor, a radio frequency (RF) circuit, and a power amplifier. The wireless communication interface 913 may be a one-chip module in which a memory that stores a communication control program, a processor that executes the program, and relevant circuits are integrated. The wireless communication interface 913 may support other kinds of wireless communication systems, such as a near field wireless communication system, a proximity wireless communication system, or a cellular communication system, in addition to the wireless LAN system. The antenna switch 914 switches a connection destination of the antenna 915 between a plurality of circuits (for example, circuits for different wireless communication system) included in the wireless communication interface 913. The antenna 915 has a single antenna element or a plurality of antenna elements (for example, a plurality of antenna elements forming a MIMO antenna) and is used to transmit and receive radio signals by the wireless communication interface 913.

Note that the smart phone 900 is not limited to the example illustrated in FIG. 22 and may include a plurality of antennas (for example, an antenna for a wireless LAN and an antenna for a proximity wireless communication system). In that case, the antenna switch 914 may be removed from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block of the smart phone 900 illustrated in FIG. 22 through feeder lines which are partially represented by dashed lines in FIG. 22. For example, the auxiliary controller 919 operates the minimum necessary function of the smart phone 900 in the sleep mode.

In the smart phone 900 illustrated in FIG. 22, the control unit 250 described with reference to FIG. 3 may be provided in the wireless communication interface 913. In addition, at least some of these functions may be provided in the processor 901 or the auxiliary controller 919.

Note that the processor 901 may perform an access point function at an application level to make the smart phone 900 operate as a wireless access point (software AP). In addition, the wireless communication interface 913 may have a wireless access point function.

6-2. Second Application Example

Figure 23:
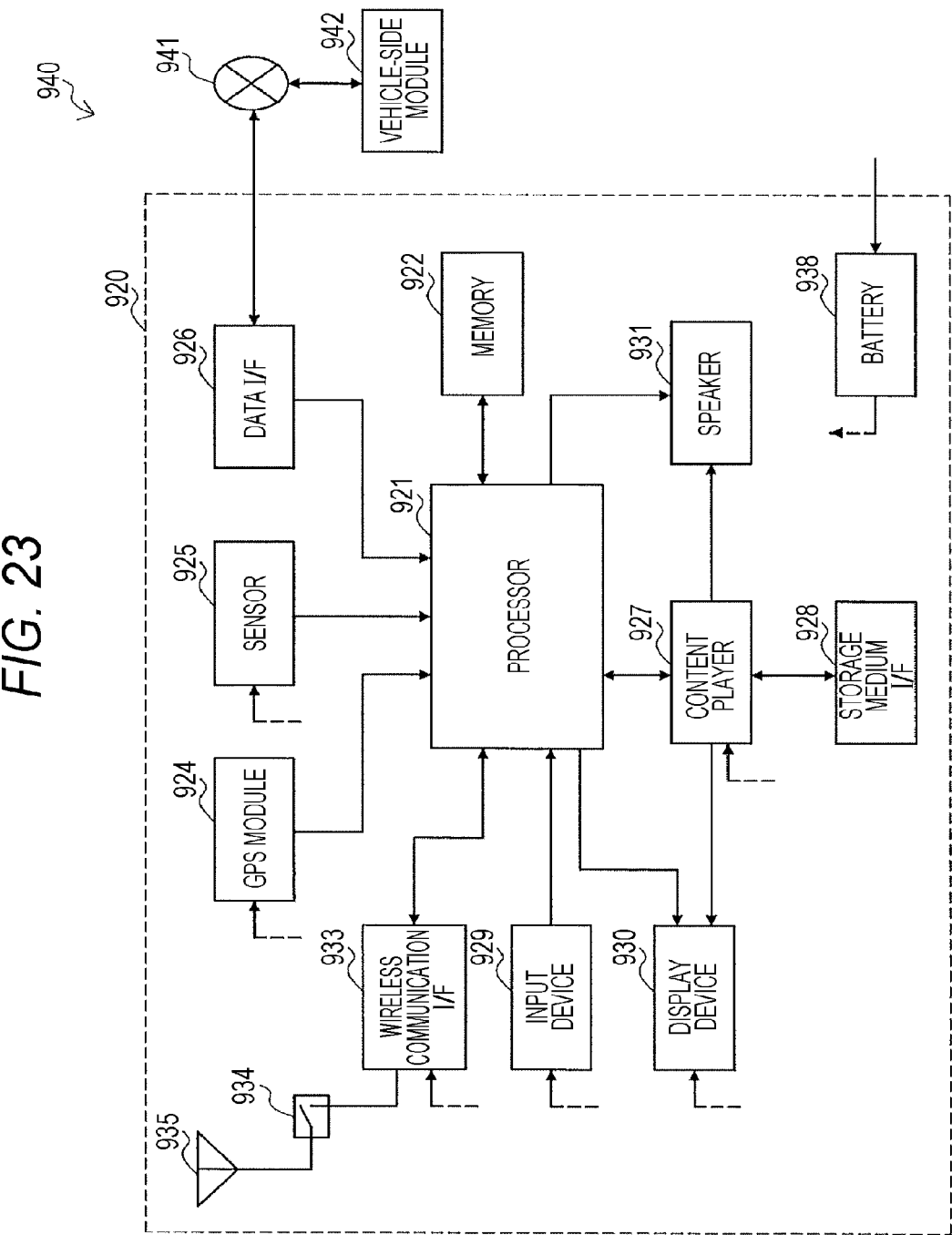
FIG. 23 is a block diagram illustrating an example of the schematic configuration of a car navigation apparatus.

FIG. 23 is a block diagram illustrating an example of the schematic configuration of a car navigation apparatus 920 to which the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC and controls a navigation function and other function of the car navigation apparatus 920. The memory 922 includes a RAM and a ROM and stores a program and data executed by the processor 921.

The GPS module 924 measures the position (such as, the latitude, longitude, and altitude) of the car navigation apparatus 920, using GPS signals received from a GPS satellite. The sensor 925 may include a group of sensors, such as a gyro sensor, a geomagnetic sensor, and an air pressure sensor. The data interface 926 is connected to, for example, an in-vehicle network 941 through a terminal (not illustrated) and acquires data generated in a vehicle, such as vehicle speed data.

The content player 927 reproduces content stored in a storage medium (such as a CD or a DVD) that is inserted into the storage medium interface 928. The input device 929 includes, for example, a touch sensor that detects a touch on a screen of the display device 930, a button, or a switch and receives an operation or an information input from a user.

The display device 930 includes a screen, such as a LCD or an OLED display, and displays an image of the navigation function or content that is reproduced. The speaker 931 outputs sounds of the navigation function or the content that is reproduced.

The wireless communication interface 933 supports one or more of the wireless LAN standards, such as IEEE 802.11a, 11b, 11g, 11n, 11ac, and 11ad, and performs wireless communication. The wireless communication interface 933 can communicate with other apparatuses through a wireless LAN access point in an infrastructure mode. In addition, the wireless communication interface 933 can directly communicate with other apparatuses in an ad hoc mode or a direct communication mode such as Wi-Fi Direct. The wireless communication interface 933 can typically include, for example, a baseband processor, an RF circuit, and a power amplifier. The wireless communication interface 933 may be a one-chip module in which a memory that stores a communication control program, a processor that executes the program, and relevant circuits are integrated. The wireless communication interface 933 may support other kinds of wireless communication systems, such as a near field wireless communication system, a proximity wireless communication system, or a cellular communication system, in addition to the wireless LAN system. The antenna switch 934 switches a connection destination of the antenna 935 between a plurality of circuits included in the wireless communication interface 933. The antenna 935 has a single antenna element or a plurality of antenna elements and is used to transmit and receive radio signals by the wireless communication interface 933.

Note that the car navigation apparatus 920 is not limited to the example illustrated in FIG. 23 and may include a plurality of antennas. In that case, the antenna switch 934 may be removed from the configuration of the car navigation apparatus 920.

The battery 938 supplies power to each block of the car navigation apparatus 920 illustrated in FIG. 23 through feeder lines that are partially represented by dashed lines in FIG. 23. In addition, the battery 938 accumulates power supplied form the vehicle.

In the car navigation apparatus 920 illustrated in FIG. 23, the control unit 250 described with reference to FIG. 3 may be provided in the wireless communication interface 933. In addition, at least some of the functions may be provided in the processor 921.

Furthermore, the wireless communication interface 933 may operate as the information processing apparatuses 200 and 201 and may provide wireless connection to the terminal of the user in the vehicle.

In addition, the present disclosure may be implemented as an in-vehicle system (or a vehicle) 940 that includes one or more blocks of the car navigation apparatus 920, the in-vehicle network 941, and a vehicle-side module 942. The vehicle-side module 942 generates vehicle data, such as a vehicle speed, an engine speed, and trouble information, and outputs the generated data to the in-vehicle network 941.

6-3. Third Application Example

Figure 24:
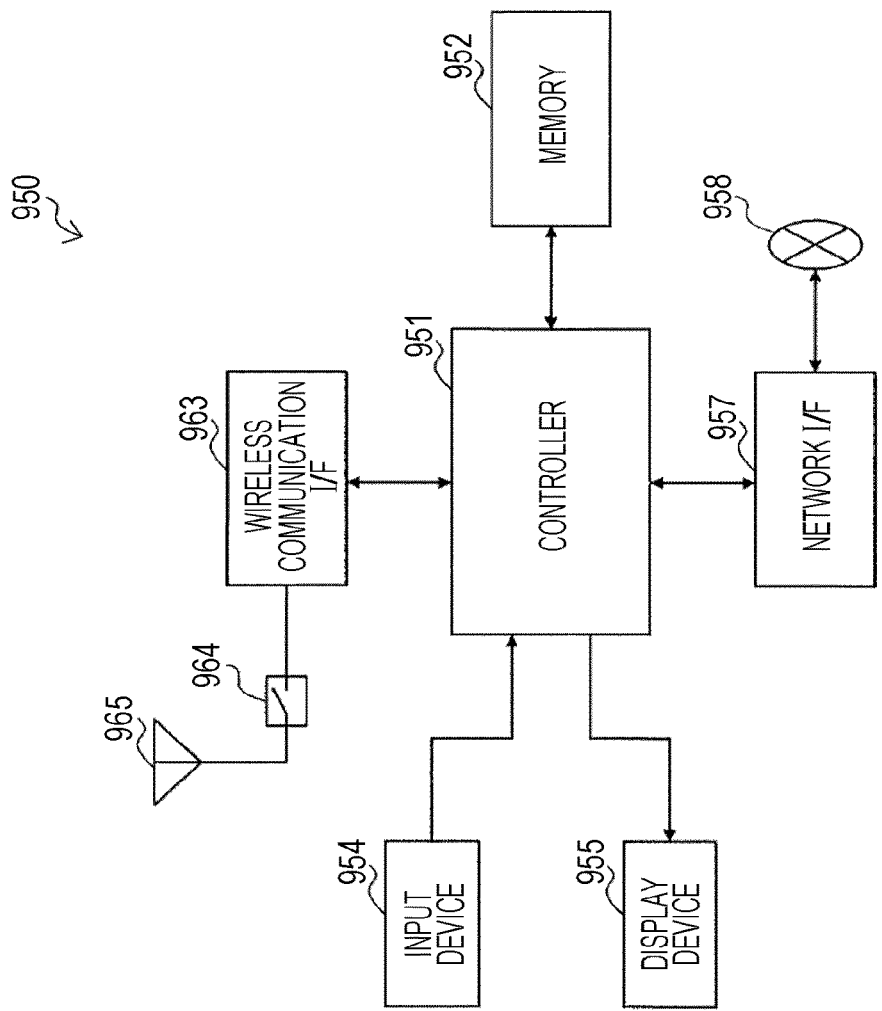
FIG. 24 is a block diagram illustrating an example of the schematic configuration of a wireless access point.

FIG. 24 is a block diagram illustrating an example of the schematic configuration of a wireless access point 950 to which the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restrictions, routing, encryption, firewall, and log management) of an Internet protocol (IP) layer and higher layers of the wireless access point 950. The memory 952 includes a RAM and a ROM and stores programs executed by the controller 951 and various kinds of control data (for example, terminal lists, routing tables, encryption keys, security settings, and logs).

The input device 954 includes, for example, a button or a switch and receives an operation from a user. The display device 955 includes, for example, an LED lamp and displays an operation status of the wireless access point 950.

The network interface 957 is a wired communication interface for connecting the wireless access point 950 to a wired communication network 958. The network interface 957 may have a plurality of connection terminals. The wired communication network 958 may be a LAN, such as Ethernet (registered trademark), or a wide area network (WAN).

The wireless communication interface 963 supports one or more of the wireless LAN standards, such as IEEE 802.11a, 11b, 11g, 11n, 11ac, and 11ad, and provides wireless connection to neighboring terminals as an access point. The wireless communication interface 963 can typically include, for example, a baseband processor, an RF circuit, and a power amplifier. The wireless communication interface 963 may be a one-chip module in which a memory that stores a communication control program, a processor that executes the program, and relevant circuits are integrated. The antenna switch 964 switches a connection destination of the antenna 965 between a plurality of circuits included in the wireless communication interface 963. The antenna 965 has a single antenna element or a plurality of antenna elements and is used to transmit and receive radio signals by the wireless communication interface 963.

In the wireless access point 950 illustrated in FIG. 24, the control unit 250 described with reference to FIG. 3 may be provided in the wireless communication interface 963. In addition, at least some of the functions may be provided in the controller 951.

Note that the above-described embodiments are examples for embodying the present technology and matters in the embodiments correspond to specific matters in the claims of the present technology. Similarly, the matters in the embodiments and the specific matters in the claims of the present technology denoted by the same names correspond to each other. However, the present technology is not limited to the embodiments and various modifications of the embodiments can be made without departing from the spirit and scope of the present technology.

In addition, the procedure described in the above-mentioned embodiments may be considered as a method including a series of processes. Furthermore, the procedure may be considered as a program that causes a computer to execute a series of processes or a recording medium that stores the program. For example, a compact disc (CD), a minidisc (MD), a digital versatile disc (DVD), a memory card, or a Blu-ray (registered trademark) disc can be used as the recording medium.

Note that the effects described in the specification are just illustrative and are not limitative. Furthermore, other effects may be obtained.

Note that the present technology may have the following configuration.

(1)

An information processing apparatus including: a control unit that, in a case where a first standby mode is set, performs control such that a first packet detection threshold value which is used in a normal standby state and a second packet detection threshold value indicating a lower packet detection probability than the first packet detection threshold value are switched to change packet detection conditions, the first and second packet detection threshold values being compared with a reception level of a packet.

(2)
The information processing apparatus according to (1), in which the first standby mode is a low power consumption standby mode.

(3)
The information processing apparatus according to (1) or (2), in which the control unit notifies other information processing apparatuses of the second packet detection threshold value at a time when the first standby mode is set.

(4)
The information processing apparatus according to any of (1) to (3), in which the control unit notifies other information processing apparatuses of a period for which the second packet detection threshold value is set at a time when the first standby mode is set.

(5)
The information processing apparatus according to any of (1) to (4), in which, in a case where a packet transmitted from other information processing apparatuses is detected while the second packet detection threshold value is used, the control unit switches the second packet detection threshold value to the first packet detection threshold value.

(6)
The information processing apparatus according to any of (1) to (5), in which, in a case where a packet transmitted from other information processing apparatuses is detected while the second packet detection threshold value is used and the detected packet is a cancellation request packet to request the cancellation of the use of the second packet detection threshold value, the control unit switches the second packet detection threshold value to the first packet detection threshold value.

(7)
The information processing apparatus according to any of (1) to (6), in which the control unit sets the first standby mode in a case where predetermined conditions are satisfied.

(8)
The information processing apparatus according to (7), in which the control unit determines that the predetermined conditions are satisfied in a case where a remaining battery level is less than a first threshold value, in a case where a user's operation for setting the first standby mode is received, in a case where an amount of desired data transmitted from other information processing apparatuses is less than a second threshold value, or in a case where an amount of interference data from other information processing apparatuses is greater than a third threshold value.

(9)
An information processing apparatus including: a control unit that, in a case where a first standby mode is set, controls a process related to transmission of a packet, on the basis of a notice to change packet detection conditions from other information processing apparatuses.

(10)
The information processing apparatus according to (9), in which the control unit suppresses the transmission of the packet while a second packet detection threshold value indicating a lower packet detection probability than a first packet detection threshold value that is used in a normal standby state is used as the packet detection conditions in the other information processing apparatuses.

(11)
The information processing apparatus according to (9), in which, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses, the control unit transmits a cancellation request packet to request the cancellation of the use of the second packet detection threshold value to the other information processing apparatuses.

(12)
The information processing apparatus according to (11), in which, while the second packet detection threshold value is used, the control unit performs a process which adjusts transmission power of the cancellation request packet such that a reception level is greater than the second packet detection threshold value in the other information processing apparatus and transmits the cancellation request packet to the other information processing apparatuses.

(13)
The information processing apparatus according to (12), in which the control unit inserts information related to the transmission power into the cancellation request packet and transmits the cancellation request packet.

(14)
The information processing apparatus according to (11), in which, while the second packet detection threshold value is used, the control unit performs a beam steering process such that a reception level is greater than the second packet detection threshold value in the other information processing apparatus and transmits the cancellation request packet to the other information processing apparatuses.

(15)
The information processing apparatus according to (14), in which the control unit inserts information for notifying that the beam steering process has been performed in transmission into the cancellation request packet and transmits the cancellation request packet.

(16)
The information processing apparatus according to any of (11) to (15), in which, while the second packet detection threshold value is used, the control unit uses only a packet with priority greater than a threshold value as the packet to be transmitted to the other information processing apparatuses.

(17)
The information processing apparatus according to any of (11) to (16), in which the control unit inserts at least one of a network identifier for identifying a network including both the information processing apparatus and the other information processing apparatuses and a terminal identifier for identifying the information processing apparatus into the cancellation request packet and transmits the cancellation request packet.

(18)
An information processing method including: in a case where a first standby mode is set, performing control such that a first packet detection threshold value which is used in a normal standby state and a second packet detection threshold value indicating a lower packet detection probability than the first packet detection threshold value are switched to change packet detection conditions, the first and second packet detection threshold values being compared with a reception level of a packet.

(19)

An information processing method including: in a case where a first standby mode is set, controlling a process related to transmission of a packet, on the basis of a notice to change packet detection conditions from other information processing apparatuses.

REFERENCE SIGNS LIST

10 Communication system
100 to 103 Information processing apparatus (slave station)
200, 201 Information processing apparatus (master station)
210 Data processing unit
220 Communication unit
221 Signal processing unit
222, 223 Wireless interface unit
224 Channel estimation unit
231, 232 Antenna
240 Storage unit
250 Control unit
260 UI unit
900 Smart phone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus comprising:
circuitry configured to:
switch an apparatus threshold, in a case where a first standby mode is set, from a first packet detection threshold value which is used in a normal standby state to a second packet detection threshold value indicating a lower packet detection probability than the first packet detection threshold value; and
compare a reception level of a packet which has been received with the apparatus threshold;
transmit a cancellation request packet to request the cancellation of the use of the second packet detection threshold value to the other information processing apparatuses, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses; and
perform, while the second packet detection threshold value is used, a beam steering process such that a reception level is greater than the second packet detection threshold value in the other information processing apparatus and transmit the cancellation request packet to the other information processing apparatuses.

2. The information processing apparatus according to claim 1, wherein the first standby mode is a low power consumption standby mode.

3. The information processing apparatus according to claim 1, wherein the circuitry is further configured to:
notify other information processing apparatuses of the second packet detection threshold value at a time when the first standby mode is set.

4. The information processing apparatus according to claim 1, wherein the circuitry is further configured to:
notify other information processing apparatuses of a period for which the second packet detection threshold value is set at a time when the first standby mode is set.

5. The information processing apparatus according to claim 1, wherein:
the circuitry is configured to switch the apparatus threshold from the second packet detection threshold to the first packet detection threshold, in a case where a packet transmitted from other information processing apparatuses is detected while the second packet detection threshold value is used.

6. The information processing apparatus according to claim 1, wherein:
the circuitry is further configured to switch the apparatus threshold from the second packet detection threshold to the first packet detection threshold, in a case where a packet transmitted from other information processing apparatuses is detected while the second packet detection threshold value is used and the detected packet is a cancellation request packet to request the cancellation of the use of the second packet detection threshold value.

7. The information processing apparatus according to claim 1, wherein:

the circuitry is further configured to set the first standby mode in a case where predetermined conditions are satisfied.

8. The information processing apparatus according to claim 7, wherein:
the circuitry is further configured to determine that the predetermined conditions are satisfied in a case where a remaining battery level is less than a first threshold value, in a case where a user's operation for setting the first standby mode is received, in a case where an amount of desired data transmitted from other information processing apparatuses is less than a second threshold value, or in a case where an amount of interference data from other information processing apparatuses is greater than a third threshold value.

9. An information processing apparatus, comprising:
circuitry configured to:
in a case where a first standby mode is set, control a process related to transmission of a packet, on the basis of a notice to change packet detection conditions from other information processing apparatuses;
transmit a cancellation request packet to request the cancellation of the use of the second packet detection threshold value to the other information processing apparatuses when there is a packet to be transmitted to the other information processing apparatuses while a second packet detection threshold value indicating a lower packet detection probability than a first packet detection threshold value that is used in a normal standby state is used as the packet detection conditions in the other information processing apparatuses; and
while the second packet detection threshold value is used, use only a packet with priority greater than a threshold value as the packet to be transmitted to the other information processing apparatuses.

10. The information processing apparatus according to claim 9, wherein:
the circuitry is further configured to suppress the transmission of the packet while a second packet detection threshold value indicating a lower packet detection probability than a first packet detection threshold value that is used in a normal standby state is used as the packet detection conditions in the other information processing apparatuses.

11. The information processing apparatus according to claim 9, wherein:
the circuitry is further configured to transmit a cancellation request packet to request the cancellation of the use of the second packet detection threshold value to the other information processing apparatuses, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses, and
the circuitry is further configured to, while the second packet detection threshold value is used, adjust transmission power of the cancellation request packet such that a reception level is greater than the second packet detection threshold value in the other information processing apparatus, and transmit the cancellation request packet to the other information processing apparatuses.

12. The information processing apparatus according to claim 11, wherein:
the circuitry is further configured to insert, information related to the transmission power into the cancellation request packet and transmit the cancellation request packet.

13. The information processing apparatus according to claim 9, wherein:
the circuitry is further configured to transmit a cancellation request packet to request the cancellation of the use of the second packet detection threshold value to the other information processing apparatuses, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses, and
the circuitry is further configured to perform, while the second packet detection threshold value is used, a beam steering process such that a reception level is greater than the second packet detection threshold value in the other information processing apparatus and transmit the cancellation request packet to the other information processing apparatuses.

14. The information processing apparatus according to claim 13, wherein:
the circuitry is further configured to insert information for notifying that the beam steering process has been performed in transmission into the cancellation request packet and transmit the cancellation request packet.

15. The information processing apparatus according to claim 9, wherein:
the circuitry is further configured to transmit a cancellation request packet to request the cancellation of the use of the second packet detection threshold value to the other information processing apparatuses, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses, and
the circuitry is further configured to insert at least one of a network identifier for identifying a network including both the information processing apparatus and the other information processing apparatuses and a terminal identifier for identifying the information processing apparatus into the cancellation request packet and transmit the cancellation request packet.

16. An information processing method, comprising:
switching an apparatus threshold in a case where a first standby mode is set, from a first packet detection threshold value which is used in a normal standby state to a second packet detection threshold value indicating a lower packet detection probability than the first packet detection threshold value;
comparing a reception level of a packet which has been received with the apparatus threshold;
transmitting a cancellation request packet to request the cancellation of the use of the second packet detection threshold value to the other information processing apparatuses when there is a packet to be transmitted to the other information processing apparatuses while a second packet detection threshold value indicating a lower packet detection probability than a first packet detection threshold value that is used in a normal standby state is used as the packet detection conditions in the other information processing apparatuses;

adjusting, while the second packet detection threshold value is used, transmission power of the cancellation request packet such that a reception level is greater than the second packet detection threshold value in the other information processing apparatus, and transmitting the cancellation request packet to the other information processing apparatuses, and inserting information related to the transmission power into the cancellation request packet and transmitting the cancellation request packet.

17. An information processing method, comprising:

switching an apparatus threshold in a case where a first standby mode is set, from a first packet detection threshold value which is used in a normal standby state to a second packet detection threshold value indicating a lower packet detection probability than the first packet detection threshold value;

comparing a reception level of a packet which has been received with the apparatus threshold;

transmitting a cancellation request packet to request the cancellation of the use of the second packet detection threshold value to the other information processing apparatuses, when there is a packet to be transmitted to the other information processing apparatuses while a second packet detection threshold value indicating a lower packet detection probability than a first packet detection threshold value that is used in a normal standby state is used as the packet detection conditions in the other information processing apparatuses; and using, while the second packet detection threshold value is used, only a packet with priority greater than a threshold value as the packet to be transmitted to the other information processing apparatuses.

\* \* \* \* \*